(12) United States Patent
Takuma et al.

(10) Patent No.: US 6,320,020 B1
(45) Date of Patent: Nov. 20, 2001

(54) SULFUR-CONTAINING (THIO)ETHER (CO)POLYMER AND A USE THEREOF

(75) Inventors: Keisuke Takuma; Kenichi Sugimoto; Atsuo Otsuji; Rihoko Suzuki; Kenichi Fujii; Masao Imai, all of Kanagawa (JP)

(73) Assignee: Mitsui Chemicals, Inc. (JP)

( * ) Notice: Subject to any disclaimer, the term of this patent is extended or adjusted under 35 U.S.C. 154(b) by 0 days.

(21) Appl. No.: 09/389,317

(22) Filed: Sep. 3, 1999

(30) Foreign Application Priority Data

| Sep. 8, 1998 | (JP) | 10-254240 |
|---|---|---|
| Sep. 24, 1998 | (JP) | 10-269467 |
| Nov. 11, 1998 | (JP) | 10-320621 |
| Mar. 2, 1999 | (JP) | 11-053546 |
| Mar. 25, 1999 | (JP) | 11-081035 |
| Mar. 25, 1999 | (JP) | 11-081036 |
| Apr. 6, 1999 | (JP) | 11-098543 |

(51) Int. Cl.[7] ............ C08G 75/60; C08F 28/04; C08F 228/04
(52) U.S. Cl. ............ 528/373; 528/106; 528/109; 525/115; 525/135; 525/150; 525/328.5
(58) Field of Search .............. 528/373, 109, 528/106; 525/115, 135, 150, 328.5

(56) References Cited

U.S. PATENT DOCUMENTS

| 4,594,291 | * | 6/1986 | BertrAm et al. .......... 428/414 |
| 4,647,648 | | 3/1987 | Silvis et al. . |
| 5,164,472 | | 11/1992 | White et al. . |
| 5,401,814 | | 3/1995 | Schomaker et al. . |

FOREIGN PATENT DOCUMENTS

| 718925 | 2/1969 | (BE) . |
| 0374258A1 | 6/1990 | (EP) . |
| 0598302A1 | 5/1994 | (EP) . |
| 0785194A1 | 7/1997 | (EP) . |
| 2687481 | 8/1993 | (FR) . |
| 939225 | 1/1961 | (GB) . |
| 1513010 | 6/1978 | (GB) . |
| 62-79224 | 4/1987 | (JP) . |
| 63-156825 | 6/1988 | (JP) . |

OTHER PUBLICATIONS

"Preparation and Characterization of High Molecular Weight Poly(hydroxy ethers) with Unusually High Glass Transition Temperatures", by H. Craig Silvis, et al., *Journal of Applied Polymer Science*, vol. 44, 1751–1757 (1992).

"Polyhydroxyethers. I, II and III. Ester Derivatives", by N.H. Reinking et al., *Journal of Applied Polymer Science*, vol. 7, pp. 2135–2160 (1963).

\* cited by examiner

*Primary Examiner*—Duc Truong
(74) *Attorney, Agent, or Firm*—Burns, Doane, Swecker, & Mathis, L.L.P.

(57) ABSTRACT

A sulfur-containing (thio)ether (co)polymer comprising repetitive structural units represented by general formulas 1 and 2, and an optical element using the (co)polymer:

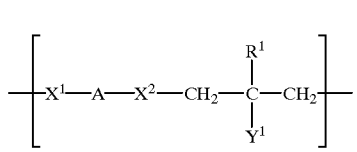

(1)

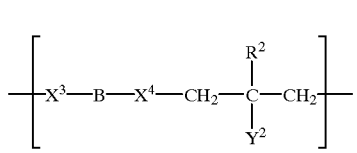

(2)

where A and B are bivalent organic group; $R^1$ and $R^2$ are hydrogen or alkyl; $X^1$ to $X^4$ are oxygen or sulfur; $Y^1$ and $Y^2$ are halogen, hydroxy, $-OR^3$ or $-SR^4$, in which $R^3$ is sulfur-containing alkyl, aryl, heterocycle or acyl optionally having a substituent other than SH; and $R^4$ is alkyl, aryl, heterocycle or acyl; provided that $-OR^3$ and/or $-SR^4$ constitute 10 to 100% of the total of $Y^1+Y^2$. The (co)polymer exhibits good optical, mechanical and thermal properties and a higher refractive index, and may be prepared in a good productivity. The sulfur-containing (thio)ether (co)polymer is useful for manufacturing a variety of optical elements.

22 Claims, No Drawings

SULFUR-CONTAINING (THIO)ETHER (CO)POLYMER AND A USE THEREOF

BACKGROUND OF THE INVENTION

1. Field of the Invention

This invention relates to a novel sulfur-containing (thio) ether (co)polymer and an optical element therewith. The sulfur-containing (thio)ether (co)polymer of this invention is a thermoplastic optical resin with excellent optical, mechanical and thermal properties, which can be prepared in a good productivity and is useful for optical elements such as an optical disk substrate; a liquid-crystal plastic substrate; various optical lenses including an eye-glass; and an LED sealing coat.

2. Description of the Prior Art

An essential property is transparency for an optical material. To date, various industrial resins with good transparency are known; for example, polymethyl methacrylate (PMMA), bisphenol-A-polycarbonate (Bis-A-PC), polystyrene (PS), methyl methacrylate-styrene copolymer (MS), styrene-acrylonitrile copolymer (SAN), poly(4-methylpentene-1) (TPX), polycycloolefin (COP), poly (diethyleneglycol bisallylcarbonate) (EGAC) and polythiourethane (PTU).

PMMA exhibits good transparency, weather resistance and moldability, but has drawbacks such as a lower refractive index ($n_d$) of 1.49 and a higher water absorbency.

Bis-A-PC exhibits good transparency, heat resistance and impact resistance and a higher refractive index, but also exhibits a larger chromatic aberration, which limits its application.

PS and MS exhibit good moldability and transparency as well as a lower water absorbency and a higher refractive index, but exhibit lower impact resistance, weather resistance and heat resistance. They have been, therefore, rarely used as an optical resin in practice.

SAN is believed to have a relatively higher refractive index and well-balanced mechanical properties, but it is inadequately heat resistant (heat-distortion temperature: 80 to 90° C.) to be used as an optical resin.

TPX and COP exhibit good transparency, lower water absorbency and good heat resistance, but have drawbacks such as a lower refractive index ($n_d$=1.47 to 1.53), lower impact resistance and lower gas barrier property.

EGAC is a thermosetting resin from diethyleneglycol bisallylcarbonate monomer, which is most frequently used for a general-purpose eyeglass. It exhibits good transparency, good heat resistance and a minimal chromatic aberration, but has drawbacks such as a lower refractive index ($n_d$=1.50) and lower impact resistance.

PTU is a thermosetting resin prepared by reaction of a diisocyanate with a polythiol, which is most frequently used for a superhigh refractive index eyeglass. It is an excellent material with good transparency, good impact resistance, a higher refractive index and a lower chromatic aberration, but has only one drawback of a longer duration for thermal-polymerization molding (1 to 3 days); i.e., there is a problem in productivity.

As described above, optical resins of the prior art have good properties, but they have their specific problems to be solved. Thus, it has been earnestly desired to develop a thermoplastic optical resin with good optical, mechanical and thermal properties as well as a good productivity and a higher refractive index.

SUMMARY OF THE INVENTION

An objective of this invention is to provide a thermoplastic optical resin with good optical, mechanical and thermal properties as well as a good productivity and a higher refractive index.

We have intensely attempted to solve the problems, and thus have obtained a thermoplastic optical resin with good optical, mechanical and thermal properties as well as a good productivity and a higher refractive index.

This invention provides (1) a sulfur-containing (thio)ether (co)polymer comprising repetitive structural units represented by general formulas 1 and 2:

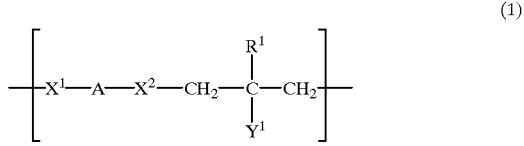

(1)

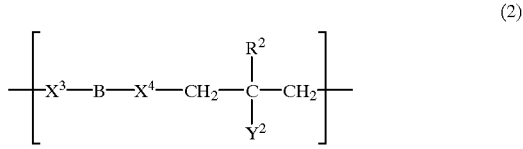

(2)

where A and B, which may be the same or different, are bivalent organic group; $R^1$ and $R^2$ are independently hydrogen or alkyl; $X^1$ to $X^4$, which may be the same or different, are independently oxygen or sulfur; $Y^1$ and $Y^2$, which may be the same or different, are independently halogen, hydroxy, —$OR^3$ or —$SR^4$, in which $R^3$ is sulfur-containing alkyl, aryl, heterocycle or acyl optionally having a substituent other than SH; and $R^4$ is non-substituted or substituted alkyl, aryl, heterocycle or acyl although when at least one of $X^1$ to $X^4$ is sulfur, $R^3$ may not contain a sulfur atom; provided that —$OR^3$ and/or —$SR^4$ constitute 10 to 100% of the total of $Y^1+Y^2$.

This invention also provides (2) a sulfur-containing (thio) ether (co)polymer as described in the above (1) wherein A and/or B is non-substituted or substituted bivalent aromatic group.

This invention also provides (3) a sulfur-containing (thio) ether (co)polymer as described in the above (2) wherein A and B are bivalent aromatic groups represented by formulas 3 and 4, respectively:

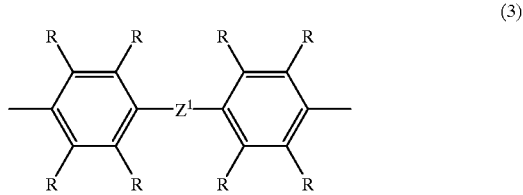

(3)

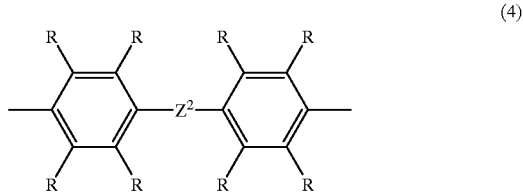

(4)

where R, which may be the same or different, is hydrogen, halogen or alkyl; and $Z^1$ and $Z^2$, which may be the same or different, are a single bond, —$C(CH_3)_2$—, —S— or —$SO_2$— linking the two aromatic groups together.

This invention also provides (4) a sulfur-containing (thio) ether (co)polymer as described in the above (3) wherein $R^3$ is sulfur-containing alkyl, aryl, heterocycle or acyl containing at least two sulfur atoms or one sulfur atom when at least one of $X^1$ to $X^4$ is a sulfur atom; and $R^4$ is alkyl, aryl, heterocycle or acyl containing at least one sulfur atom.

This invention also provides (5) a sulfur-containing (thio) ether (co)polymer as described in the above (3) or (4) wherein $Z^1$ is —C(CH$_3$)$_2$—.

This invention also provides (6) a sulfur-containing (thio) ether (co)polymer as described in the above (5) wherein $X^1$ and $X^2$ are oxygen.

This invention also provides (7) a sulfur-containing (thio) ether (co)polymer as described in the above (5) wherein $Z^1$ is —C(CH$_3$)$_2$— and $Z^2$ is a single bond or —C(CH$_3$)$_2$—.

This invention also provides (8) a sulfur-containing (thio) ether (co)polymer as described in the above (7) wherein all of $X^1$ to $X^4$ are oxygen.

This invention also provides (9) a sulfur-containing (thio) ether (co)polymer as described in the above (3) or (4) wherein $Z^1$ is —S—.

This invention also provides (10) a sulfur-containing (thio)ether (co)polymer as described in the above (9) wherein $X^1$ and $X^2$ are sulfur.

This invention also provides (11) an optical element manufactured using a sulfur-containing (thio)ether (co)polymer as described in any of the above (1) to (3).

This invention also provides (12) a plastic lens manufactured using a sulfur-containing (thio)ether (co)polymer as described in any of the above (1) to (3).

A sulfur-containing (thio)ether (co)polymer herein refers to a polymer or copolymer essentially containing a sulfur atom whose principal backbone comprises ether and/or thioether bonds. Therefore, when the principal chain comprises an ether bond, a sulfur atom must be contained in the remaining part other than the ether-bond moiety in the principal backbone; for example, in a pendant group. On the contrary, when the principal backbone comprises a thioether bond, the remaining part other than the thioether-bond moiety in the principal backbone may not necessarily contain a sulfur atom.

DESCRIPTION OF THE PREFERRED EMBODIMENTS

The sulfur-containing (thio)ether (co)polymer of this invention is a novel (co)polymer comprising repetitive structural units represented by general formulas 1 and 2. It is a thermoplastic optical resin with good optical, mechanical and thermal properties as well as a good productivity and a higher refractive index, which is useful for optical elements such as an optical disk substrate; a liquid-crystal plastic substrate; various optical lenses including an eye-glass; and an LED sealing coat.

In the general formulas (1) and (2), A and B, which may be the same or different, are a bivalent organic group. A bivalent organic group herein is a bivalent aliphatic or aromatic group or a combination thereof. The organic group may have a substituent and a hetero atom such as nitrogen and sulfur. It preferably contains a sulfur atom for improving a refractive index.

A bivalent organic group is preferably a linear or cyclic aliphatic group or an aromatic group which may contain a hetero atom; more preferably an aromatic group which may contain a hetero atom; particularly phenylene, naphthylene or an aromatic group in which at least two of these groups are linked via a bi-, tri- or tetravalent linking group.

These organic groups may have a substituent such as alkyl, alkoxy, alkylthio or halogen; preferably $C_{1-4}$ alkyl, $C_{1-4}$ alkoxy, $C_{1-4}$ alkylthio or bromine; more preferably methyl, methoxy, methylthio or bromine.

A and B as a bivalent organic group may include, but are not limited to, the following structures.

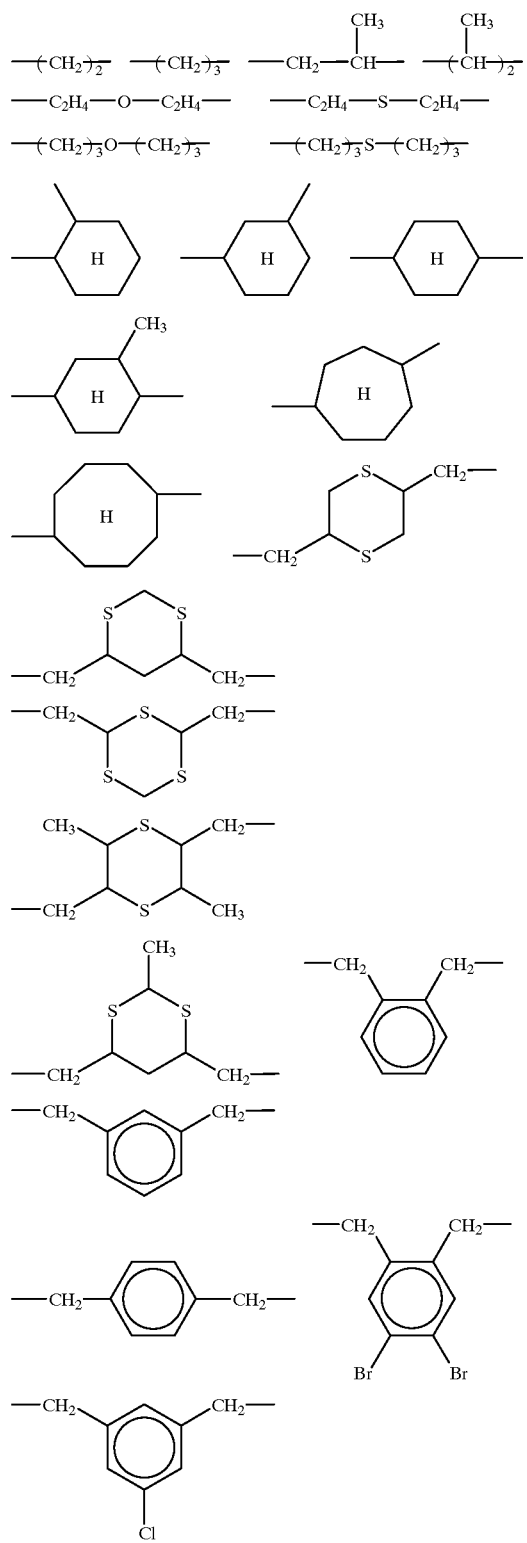

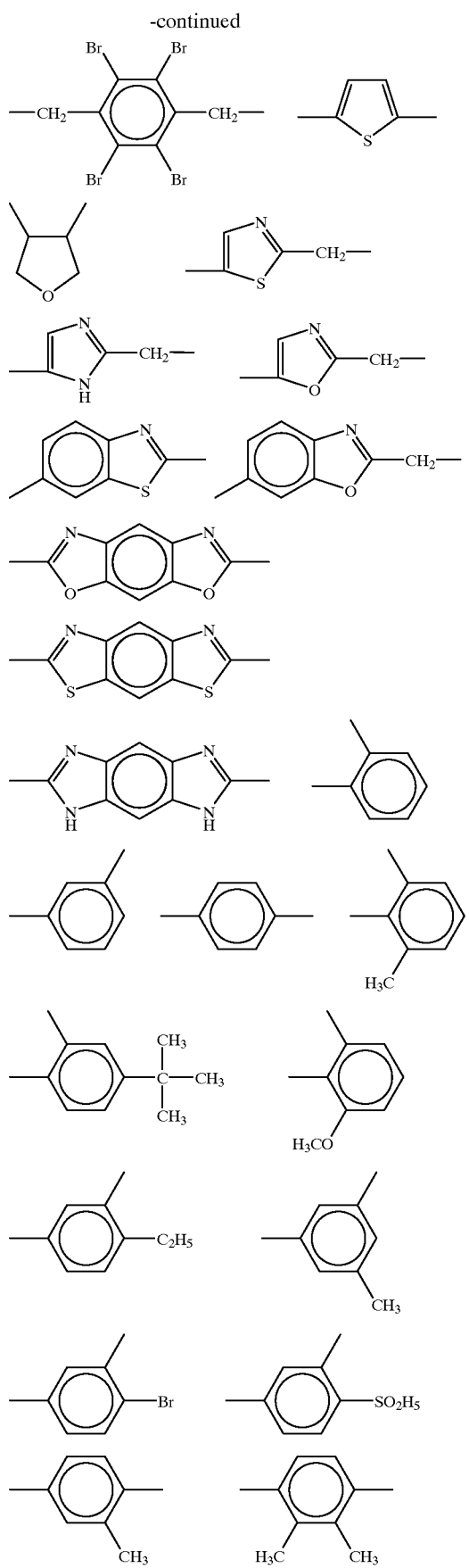
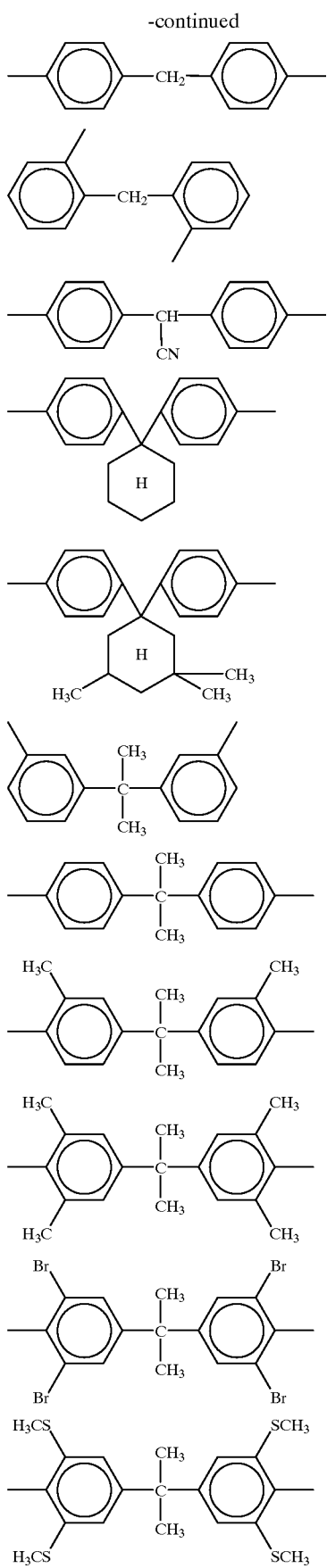

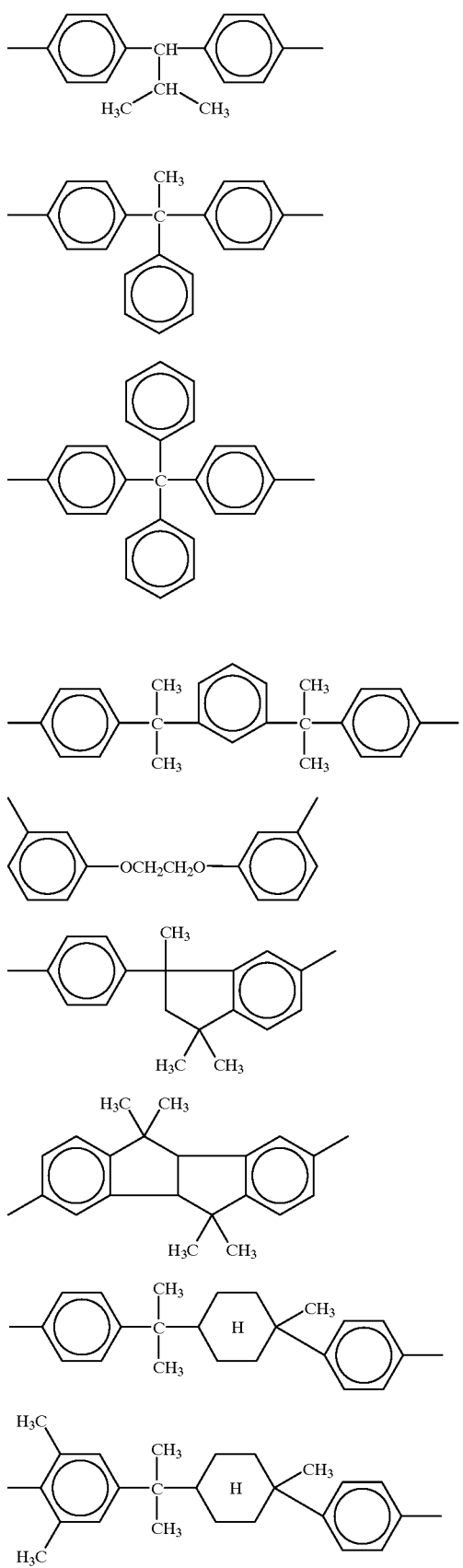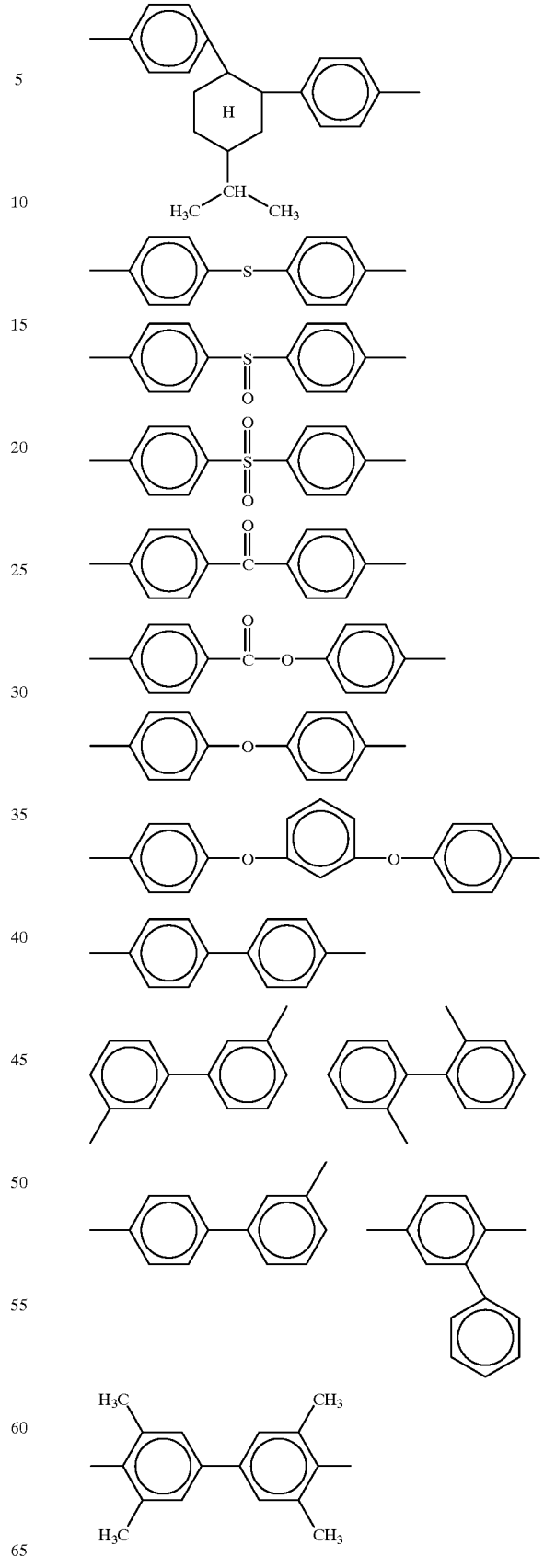

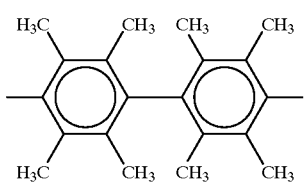
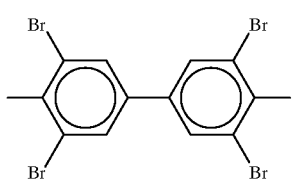
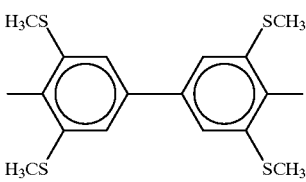
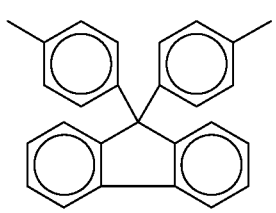
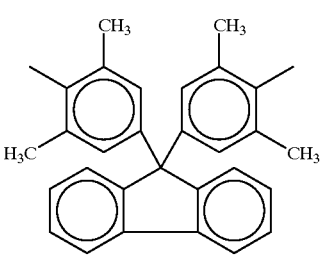
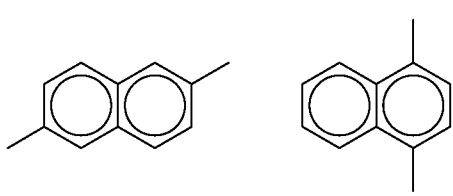
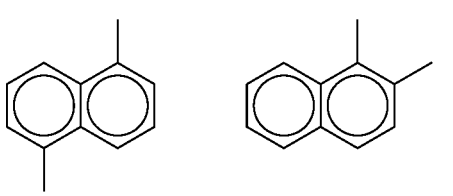
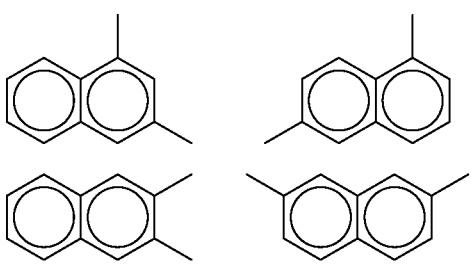

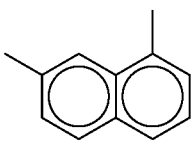

Among the above organic groups, A and B are preferably a bivalent aromatic group. More preferably, A and B are the bivalent aromatic groups represented by formulas 3 and 4, respectively:

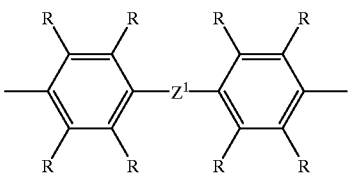

(3)

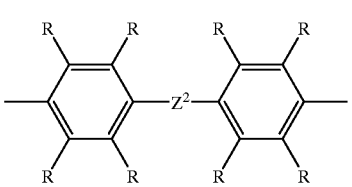

(4)

wherein R, which may be the same or different, is hydrogen, halogen or alkyl; and $Z^1$ and $Z^2$, which may be the same or different, are a single bond, —C(CH$_3$)$_2$—, —S— or —SO$_2$— linking the two aromatic groups together.

In general formulas 1 and 2, substituents $R^1$ and $R^2$ are independently hydrogen or alkyl; preferably hydrogen or $C_{1-6}$ alkyl; specifically hydrogen, methyl, ethyl, isopropyl or cyclohexyl. In particular, $R^1$ and $R^2$ are independently hydrogen or methyl.

In general formulas 1 and 2, $X^1$ to $X^4$, which may be the same or different, are independently oxygen or sulfur.

In general formulas 1 and 2, $Y^1$ and $Y^2$, which may be the same or different, are independently halogen, hydroxy, —OR$^3$ or —SR$^4$ although —OR$^3$ and/or —SR$^4$ constitute 10 to 100% of the total of $Y^1+Y^2$. $R^3$ is sulfur-containing alkyl, aryl, heterocycle or acyl optionally having a substituent other than SH, although when at least one of $X^1$ to $X^4$ is sulfur, $R^3$ may not contain a sulfur atom; and $R^4$ is non-substituted or substituted alkyl, aryl, heterocycle or acyl. $R^3$ which may not contain a sulfur atom is equivalent to $R^4$.

Examples of sulfur-containing substituent $R^3$ are, but not limited to, non-substituted or substituted sulfur-containing alkyls such as methylthiomethyl, methylthioethyl, ethylthioethyl, methylthiomethylthiomethyl, methylthioethylthioethyl, methylthiopropyl, methylthiobutyl, methylthiobutylthiomethyl, cyclohexylthioethyl, cyclohexylthioethylthiomethyl, 1-adamanthylthiomethyl, 1-adamanthylthiomethylthiomethyl, benzylthiomethyl, benzylthiomethylthiomethyl, 3-methylthiobenzyl, 3,4-dimethylthiobenzyl, phenethylthiomethyl and phenethylthiomethylthiomethyl;

sulfur-containing aryls such as 2-methylthiophenyl, 4-methylthiophenyl, 2,3-dimethylthiophenyl, 2,4-dimethylthiophenyl, 2,3,4,5,6-pentamethylthiophenyl, 2-methylthio-p-toluyl, 2,3-dimethylthio-o-toluyl, 3-methylthio-4-methoxyphenyl, 3-chloro-4-methylthiophenyl, 2-bromo-4-methylthiophenyl, 5-methylthio-1-naphthyl and 6-methylthio-2-naphthyl;

sulfur-containing heterocycles such as 1,4-dithian-2-yl, 1,3-dithian-2-yl, 1,3,5-trithian-2-yl, 1,4-dithiaspiro(4,5)decan-8-yl, 1,5-dithiacyclooctan-3-yl, thiophen-3-yl, 3,4-dicyanothiophen-2-yl, tetrahydrothiophen-2-yl, tetramethylenesulfon-3-yl, pentamethylenesulfid-4-yl and thiazol-2-yl; and sulfur-containing acyls such as methylthioacetyl, ethylthioacetyl, isopropylthioacetyl, t-butylthioacetyl, phenylthioacetyl, cyclohexylthioacetyl, methylthioethylcarbonyl, methylthiopropylcarbonyl, methylthioethylthioacetyl, methylthiopropylthioacetyl, 1,4-dithiane-2-carbonyl, 1,3-dithiane-2-carbonyl, 1,3,5-trithiane-2-carbonyl, 1,4-dithiaspiro(4,5)decane-8-carbonyl, 1,5-dithiacyclooctane-3-carbonyl, thiophene-3-carbonyl and pentamethylenesulfide-4-carbonyl.

Considering that a sulfur-containing (thio)ethyl (co)polymer of this invention is used for improving a refractive index, $R^3$ is preferably alkyl, aryl, heterocycle or acyl containing two or more sulfur atoms although when at least one of $X^1$ to $X^4$ is a sulfur atom, $R^3$ has one or more sulfur atom.

Examples of substituent $R^4$ are, but not limited to, non-substituted or substituted linear, branched or cyclic alkyls such as methyl, ethyl, n-propyl, isopropyl, n-butyl, t-butyl, sec-butyl, cyclohexyl, norbornyl, adamanthyl, methoxyethyl, benzyl, phenethyl, methylthiomethyl, methylthioethyl, ethylthioethyl, methylthiomethylthiomethyl, methylthioethylthioethyl, methylthiopropyl, methylthiobutyl, methylthiobutylthiomethyl, cyclohexylthioethyl, cyclohexylthioethylthiomethyl, 1-adamanthylthiomethyl, 1-adamanthylthiomethylthiomethyl, benzylthiomethyl, benzylthiomethylthiomethyl, 3-methylthiobenzyl, 3,4-dimethylthiobenzyl, phenethylthiomethyl and phenethylthiomethylthiomethyl;

non-substituted or substituted aryls such as phenyl, 2-methylphenyl, 2-methoxyphenyl, 4-methylphenyl, 2,3-dimethylphenyl, 2,4-dimethylphenyl, 3-bromophenyl, 4-bromophenyl, 2-methylthiophenyl, 4-methylthiophenyl, 2,3-dimethylthiophenyl, 2,4-dimethylthiophenyl, 2,3,4,5,6-pentamethylthiophenyl, 2-methyl-p-toluyl, 2,3-dimethylthio-o-toluyl, 3-methyl-4-methoxyphenyl, 3-chloro-4-methylthiophenyl, 2-bromo-4-methylthiophenyl, 5-methylthio-1-naphthyl and 6-methylthio-2-naphthyl;

non-substituted or substituted heterocycles such as furan-2-yl, tetrahydrofuran-2-yl, 1,4-dioxan-2-yl, 1,3-dioxan-2-yl, 1,4-dithian-2-yl, 1,3-dithian-2-yl, 1,3,5-trithian-2-yl, 1,4-dithiaspiro(4,5)decan-8-yl, 1,5-dithiacyclooctan-3-yl, thiophen-3-yl, 3,4-thiophen-2-yl, tetrahydrothiophen-2-yl, thiazol-2-yl, tetramethylenesulfon-3-yl and pentamethylenesulfid-4-yl; and non-substituted or substituted acyls such as acetyl, thylcarbonyl, isopropylcarbonyl, t-butylcarbonyl, benzoyl, cyclohexylcarbonyl, methylthioacetyl, ethylthioacetyl, isopropylthioacetyl, t-butylthioacetyl, phenylthioacetyl, cyclohexylthioacetyl, methylthioethylcarbonyl, methylthiopropylcarbonyl, methylthioethylthioacetyl, methylthiopropylthioacetyl, 1,4-dithiane-2-carbonyl, 1,3-dithiane-2-carbonyl, 1,3-dithiolane-2-carbonyl, 1,3,5-trithiane-2-carbonyl, 1,4-dithiaspiro(4,5)decane-8-carbonyl, 1,5-dithiacyclooctane-3-carbonyl, thiophene-3-carbonyl and pentamethylenesulfide-4-carbonyl.

Considering that a sulfur-containing (thio)ethyl (co)polymer of this invention is used for improving a refractive index, $R^4$ is preferably alkyl, aryl, heterocycle or acyl containing at least one sulfur atom; more preferably alkyl, aryl, heterocycle or acyl containing at least two sulfur atoms.

$R^3$ or $R^4$ containing a mercapto group (—SH) in its structure tends to form an intermolecular disulfide bond, i.e., an intermolecular crosslink, which may make injection molding difficult. Such a structure is, therefore, undesirable.

In a sulfur-containing (thio)ether (co)polymer of this invention, —$OR^3$ and/or —$SR^4$ constitute 10 to 100%, preferably 20 to 95%, particularly 50 to 90% of the total of $Y^1+Y^2$ in general formulas 1 and 2.

If —$OR^3$ and/or —$SR^4$ constitute less than 10% of the total of $Y^1+Y^2$, i.e., 90% or more of the total of $Y^1+Y^2$ is constituted by halogen or hydroxy, a resulting polymer is less processable due to its higher melt viscosity and less effective for improving a refractive index.

A sulfur-containing (thio)ether (co)polymer comprises the repetitive structural units represented by general formulas 1 and 2. In these formulas, A and B are preferably represented by general formulas 3 and 4, respectively. More preferably, (a) $Z^1$ is —$C(CH_3)_2$— or (b) $Z^1$ is —S—. More preferably, (c) $Z^1$ is —$C(CH_3)_2$— and $X^1$ and $X^2$ are oxygen; (d) $Z^1$ is —S— and $X^1$ and $X^2$ are sulfur; or (e) $Z^1$ is —$C(CH_3)_2$— and $Z^2$ is a single bond or —$C(CH_3)_2$—. Particularly, (f) $Z^1$ is —$C(CH_3)_2$—, $Z^2$ is a single bond or —$C(CH_3)_2$— and all of $X^1$ to $X^4$ are oxygen.

A sulfur-containing (thio)ether (co)polymer of this invention may be prepared by reacting a starting (thio)ether (co)polymer thereof comprising the repetitive structural units represented by general formulas 1 and 2 where $Y^1$ and $Y^2$ are —OH and/or halogen, or a tosylate thereof, with a $R^3$— and/or $R^4$— introducing agent (hereinafter, referred to as a "pendant-forming agent"), to convert 10 to 100% of —OH and/or halogen into —$OR^3$ and/or —$SR^4$, i.e., adding an alkyl, aryl, heterocycle or acyl group as a pendant group (hereinafter, referred to as "pendant formation"). The starting material in which $Y^1$ and $Y^2$ are halogen and/or tosylate may be prepared from —OH by a known functional-group conversion process.

The starting ether (co)polymer may be prepared by reacting and polymerizing (i) a compound represented by general formula 5 with a diglycidyl ether or bis(2-alkylglycidyl) derivative represented by general formula 6, or (ii) a diglycidyl ether or bis(2-alkylglycidyl) derivative of the compound represented by general formula 5 with the compound represented by general formula 6:

  (5)

  (6)

where A, B, $X^1$, $X^2$, $X^3$ and $X^4$ are as defined above, in the presence of an epoxy-polymerization catalyst such as phosphorous compounds including triphenylphosphine and nitrogen-containing organic compounds including imidazole.

A hydroxy ether polymer, in which A and B are represented by general formulas 3 and 4, respectively, all Rs are hydrogen, both $Z^1$ and $Z^2$ are —C(CH$_3$)$_2$—, and all of $X^1$ to $X^4$ are oxygen, may be prepared according to a known process described in, for example, N. H. Reinking et al., J.Appl.Poly.Sci., 7, 2135–2144 (1963); idem., 7, 2145–2152 (1963); idem., 7, 2153–2160 (1963); or H. C. Silvis et al., J.Appl.Poly.Sci., 44, 1751–1757 (1992). Specifically, in the presence of triphenylphosphine (TPP) catalyst, bisphenol-A-diglycidyl ether may be reacted with almost equimolar bisphenol A in dimethylacetamide (DMAc) in the atmosphere of nitrogen at 160 to 170° C. for 5 hours, to provide bisphenol-A-polyhydroxy ether.

The starting (thio)ether (co)polymer thus obtained may be suitably reacted with an optionally sulfur-containing pendant-forming agent, to provide a sulfur-containing (thio) ether (co)polymer of this invention.

For example, when starting with bisphenol-A-polyhydroxy ether, the starting ether may be reacted with methylthioethylthioethyl tosylate in the presence of potassium carbonate, at 120 to 130° C. for 8 hours, to provide methylthioethylthioethylated bisphenol-A-polyether polymer.

In a sulfur-containing (thio)ether (co)polymer, —OR$^3$ and/or —SR$^4$ constitute 10 to 100% of the total of $Y^1+Y^2$. The amount may be arbitrarily controlled by adjusting an equivalent ratio between —OH and/or halogen in the starting polyether polymer and the pendant-forming agent.

An etherified or acylated ether polymer prepared in which a hydroxy group in a polyhydroxy ether is converted into a pendant group by adding an alkyl, cycloalkyl, aralkyl or alkylcarbonyl group, is known. Such a compound is described in, for example, J.Appl.Poly.Sci., 7, 2135–2144 (1963) and JP-A 63-156825, which disclose a compound not containing a sulfur atom in its pendant group.

J.Appl.Poly.Sci., 7, 2135–2144 (1963) also describes a polyether polymer having a pendant group from mercaptomethyl carbonyl group. We, however, have found that when the mercaptomethylcarbonylated polyether polymer is subjected to injection molding, the mercapto groups in the molecular structure are air-oxidized to form intermolecular disulfide-crosslinks, which significantly reduce melt fluidity and thus make injection molding substantially infeasible.

A sulfur-containing (thio)ether (co)polymer of this invention comprising a pendant group formed using a sulfur-containing group other than mercapto group is a novel compound and further it is unknown that such a compound exhibits excellent optical properties such as a higher refractive index and a higher Abbe's number.

The weight-average molecular weight of the sulfur-containing (thio)ether (co)polymer of this invention is generally, but not limited to, 5,000 to 500,000, preferably 10,000 to 400,000, more preferably 50,000 to 300,000.

An optical element of this invention may be manufactured using the sulfur-containing (thio)ether (co)polymer of this invention; for example, a plastic lens, a variety of optical lenses, an optical disk substrate, a liquid-crystal plastic substrate and an LED sealing coat.

The sulfur-containing (thio)ether (co)polymer of this invention may be, of course, used alone to form an optical element or plastic lens, or it may be combined, i.e., alloyed with another transparent resin as long as it does not adversely affect a desired effect.

The content of the sulfur-containing (thio)ether (co) polymer of this invention in such an alloyed resin is generally at least 50 wt %, preferably at least 70 wt % and more preferably at least 80 wt %.

Additional transparent resins which may be used include polymethyl methacrylate (PMMA), bisphenol-A-polycarbonate (Bis-A-PC), polystyrene (PS), methylmethacrylate-styrene copolymer (MS), styrene-acrylonitrile copolymer (SAN), poly(4-methylpentene-1) (TPX), polycycloolefin (COP), fluorine-containing polyimide (F-PI), fluorine-containing polyamide (F-PA), polyethersulfone (PES), polyethylene terephthalate (PET) and polyphenylene oxide (PPO).

Additives such as a pigment, a dye, a thermal stabilizer, an antioxidant, an ultraviolet absorber, a mold release, a flame retardant, an alkali-metal sulfonate, glass fiber, glass beads, carbon fiber, barium sulfate and titanium oxide may be added during or after preparing the sulfur-containing (thio)ether (co)polymer of this invention, for using the (co)polymer alone or in combination, i.e., as an alloy, with another transparent resin, as a molding material for, e.g., an optical element.

The sulfur-containing (thio)ether (co)polymer of this invention alone or in combination (or as an alloy) with another transparent resin, or, if desirable, as a mixture with any of the above additives, may be effectively used as a molding material for forming various products such as the above optical elements, a chassis or housing for an electric device, an electronic element, an automotive product and an alternate material for glass.

The sulfur-containing (thio)ether (co)polymer of this invention is thermoplastic. The molten (co)polymer may be, therefore, readily subject to injection molding, extrusion molding, blow molding and impregnation in a filler, and may be also molded by a variety of known processes such as compression molding and solution casting. Thus, a molding time may be reduced and a productivity may be significantly improved.

An optical element of this invention thus obtained exhibits excellent optical, mechanical and thermal properties, in particular a significantly improved refractive index, and therefore, is practically quite useful.

EXAMPLES

This invention will be specifically described, but not limited to, by examples.

Physical properties shown in the following examples and the tables were determined as follows.

Pendant-forming Rate [P-rate (%)]

This was determined by hydroxyl-value measurement or $^{13}$C-NMR spectroscopy. This value represents the rate of $(Y^1+Y^2)$ to which an alkyl, aryl, heterocycle or acyl group is added, in a starting (thio)ether (co)polymer.

Weight-average Molecular Weight [MW(PS-converted)]

A 0.2 wt % solution of a sulfur-containing (thio)ether (co)polymer in dimethylformamide was measured by G-PC (gel permeation chromatography) [using a chromatograph System-11, Showa Denko] to determine a weight-average molecular weight (MW). A measured value is herein a value after conversion to standard polystyrene.

Coloring (Transparency)

This was visually observed.

Refractive Index ($n_d$), Abbe's Number

This was measured at 20° C. using a Pulfrich refractometer.

Heat-distortion Temperature

This was determined using a test strip ½ inches of thickness at 66 psi, according to ASTM D648.

Example 1

In a glass vessel equipped with a nitrogen inlet tube, a thermometer, a reflux condenser and an agitator was placed 700 g of N,N'-dimethylacetamide, into which were added 228 g of bisphenol A (1 mol), 340 g of bisphenol-A-diglycidyl ether (epoxy equivalent: 170 eq/g) and 1 g of triphenylphosphine, and then the mixture was reacted at 160 to 170° C. for 5 hours under nitrogen atmosphere. Then, the mixture was cooled to 80 to 90° C., 200 g of pyridine was added and then 421 g of 1,3,5-trithiane-2-carboxyl chloride (2.1 mol) was added dropwise over 3 hours. The reaction mixture was stirred at the temperature for additional 3 hours, and then cooled to room temperature. The reaction mixture was added dropwise over 3 hours into vigorously stirred methanol (3 L), to precipitate a polymer. The polymer was filtered, washed with 1 L of methanol and then 2 L of distilled water, and then dried. The resulting polymer was dissolved in 500 g of tetrahydrofuran, and was added dropwise over 3 hours into vigorously stirred methanol (3 L), to precipitate a polymer. The polymer was filtered, washed with 1 L of methanol and then 2 L of distilled water, and then dried, to provide 652 g of the polymer, whose esterification rate for hydroxy groups (i.e., pendant-forming rate) was 98%.

The sulfur-containing (thio)ether (co)polymer was clear and had a weight-average molecular weight (polystyrene-converted) of 156,000, a refractive index ($n_d$) of 1.616 and an Abbe's number of 35.1. This polymer had an adequately high heat-distortion temperature of 120° C. or higher.

Examples 2 to 7

One of the aromatic diols shown in Table 1 and its diglycidyl ether were reacted as described in Example 1 to provide a polyhydroxy ether. The ether was reacted with a sulfur-containing agent, i.e., a pendant-forming agent, to be alkylated, arylated, heterocyclized or acylated, giving a sulfur-containing (thio)ether (co)polymer. When the polyhydroxy ether was inadequately reactive, its hydroxy group was converted into a form of sodium salt, and then it was reacted with a sulfur-containing agent.

All of the resulting sulfur-containing (thio)ether (co) polymers had excellent optical properties and heat resistance as was for the polymer in Example 1. The results are summarized in Table 2.

In Table 2, "MW (PS-converted)" means a polystyrene-converted weight-average molecular weight. "P-rate" means a pendant-forming rate of hydroxy groups in an intermediate polyhydroxy ether with a sulfur-containing agent. Hereinafter, the same definitions will be used.

The pendant-forming rate was controlled by adjusting an equivalent ratio between hydroxy groups in the polyhydroxy ether polymer and the pendant-forming agent.

TABLE 1

| Example | Starting materials | | |
|---|---|---|---|
| | Aromatic diol | Aromatic diol diglycidyl ether | Sulfur-containing agent |
| 2 | | | |
| 3 | | | |
| 4 | | | |
| 5 | | | |

TABLE 1-continued
| Example | Starting materials | | |
|---|---|---|---|
| | Aromatic diol | Aromatic diol diglycidyl ether | Sulfur-containing agent |
| 6 | 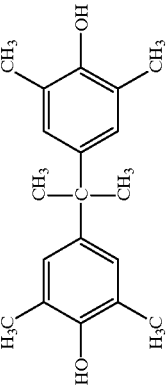 | 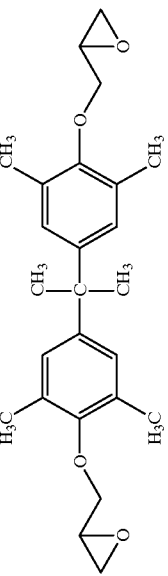 | 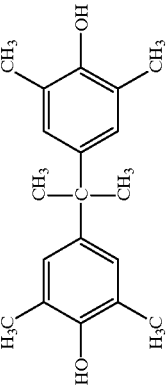 |
| 7 | 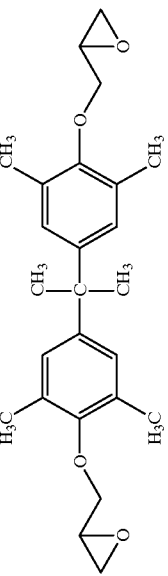 | 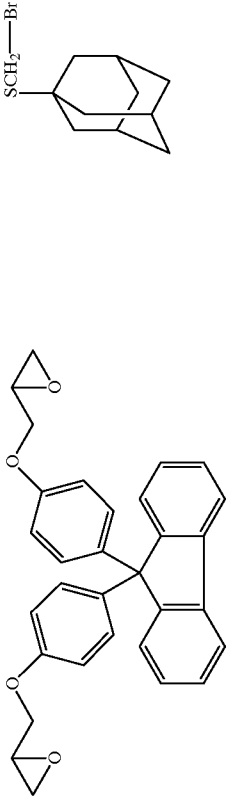 | 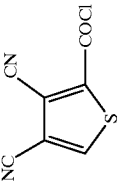 |

TABLE 2

| Example | Polymer product | | Optical properties | |
| --- | --- | --- | --- | --- |
| | MW (PS converted) | P rate (%) | Refractive index ($n_d$) | Abbe's number |
| 2 | 98,000 | 97 | 1.629 | 35.8 |
| 3 | 122,000 | 65 | 1.654 | 33.1 |
| 4 | 157,000 | 76 | 1.620 | 32.6 |
| 5 | 101,000 | 83 | 1.649 | 34.8 |
| 6 | 85,000 | 50 | 1.626 | 33.0 |
| 7 | 116,000 | 57 | 1.655 | 29.1 |

Example 8

To 350 g of N,N'-dimethylacetamide were added 110 g of hydroquinone (1 mol), 374 g of bisphenol-S-di-2-methylglycidyl ether (epoxy equivalent: 187 eq/g) and 1 g of triphenylphosphine, and then the mixture was reacted at 160 to 170° C. for 5 hours under nitrogen atomosphere. Then, the mixture was cooled to 130 to 140° C., 100 g of potassium carbonate was added and then 300 g of methylthioethyl tosylate was added dropwise over 3 hours. The reaction mixture was stirred at the temperature for additional 3 hours, and then cooled to room temperature. The reaction mixture was added dropwise over 3 hours into vigorously stirred methanol (3 L), to precipitate a polymer. The polymer was filtered, washed with 1 L of methanol and then 2 L of distilled water, and then dried. The resulting polymer was dissolved in 200 g of tetrahydrofuran, and was added dropwise over 3 hours into vigorously stirred methanol (3 L), to precipitate a polymer. The polymer was filtered, washed with 1 L of methanol and then 2 L of distilled water, and then dried, to provide 536 g of the polymer, whose pendant-forming rate was 99%.

The sulfur-containing (thio)ether (co)polymer was clear and had a weight-average molecular weight of 182,000, a refractive index of 1.608 and an Abbe's number of 37.2. This polymer had an adequately high heat-distortion temperature of 120° C. or higher.

Examples 9 to 18

One of the aromatic diols shown in Table 3 and an diglycidyl ether of another aromatic diol were reacted as described in Example 8 to provide a polyhydroxy ether. The polyhydroxy ether was subject to a pendant-forming reaction with a sulfur-containing agent to provide a sulfur-containing (thio)ether (co)polymer. When the polyhydroxy ether was inadequately reactive, its hydroxy group was converted into sodium salt, and then it was reacted with a sulfur-containing agent.

All of the resulting sulfur-containing (thio)ether (co) polymers had excellent optical properties and heat resistance as was for the polymer in Example 8. The results are summarized in Table 4.

TABLE 3
| Example | Starting materials | | |
|---|---|---|---|
| | Aromatic diol | Aromatic diol diglycidyl ether | Sulfur-containing agent |
| 9 | 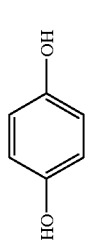 | 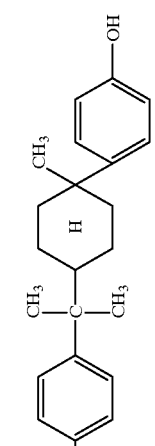 | 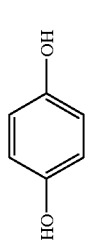 |
| 10 | 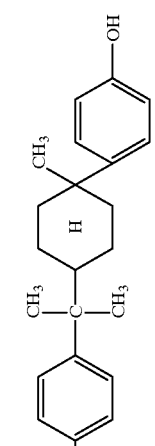 |  | 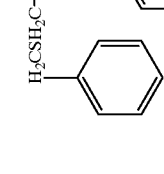 |

TABLE 3-continued

| Example | Starting materials | | |
|---|---|---|---|
| | Aromatic diol | Aromatic diol diglycidyl ether | Sulfur-containing agent |
| 11 | (tetrabromobisphenol A structure) | (spirobiindane diglycidyl ether structure) | (1,3-dithiane tosylate and methylated dithiane tosylate, 50:50 mixture) |
| 12 | (4,4'-dihydroxybenzophenone cyanohydrin structure) | (resorcinol bis(2-methylglycidyl) ether structure) | (thiazole-2-carbonyl chloride) |
| 13 | (bisphenol-type structure with CH-CH(CH₃)₂) | (4,4'-biphenol bis(2-methylglycidyl) ether structure) | |

TABLE 3-continued

Starting materials

| Example | Aromatic diol | Aromatic diol diglycidyl ether | Sulfur-containing agent |
|---|---|---|---|
| 14 | | | |
| 15 | | | |
| 16 | | | |

TABLE 3-continued

| | Starting materials | | |
|---|---|---|---|
| Example | Aromatic diol | Aromatic diol diglycidyl ether | Sulfur-containing agent |
| 17 | [structure: 1,1-bis(4-hydroxyphenyl)cyclohexane] | [structure: diglycidyl ether of bisphenol-S with methyl-substituted epoxides] | [structure: tetrahydrothiophene-3-carbonyl chloride] |
| 18 | [structure: 4,4'-sulfonyldiphenol] | [structure: diglycidyl ether of 1,1-bis(4-hydroxyphenyl)-3,3,5-trimethylcyclohexane with methyl-substituted epoxides] | [structure: $SCH_2$—S—CH(CH_3)—CH_3 with CH_2COCl branch] |

TABLE 4

| Example | Polymer product | | Optical properties | |
|---|---|---|---|---|
| | MW (PS converted) | P rate (%) | Refractive index ($n_d$) | Abbe's number |
| 9 | 183,000 | 81 | 1.609 | 33.3 |
| 10 | 142,000 | 62 | 1.608 | 31.8 |
| 11 | 151,000 | 100 | 1.634 | 33.7 |
| 12 | 212,000 | 70 | 1.606 | 34.5 |
| 13 | 173,000 | 55 | 1.622 | 31.9 |
| 14 | 132,000 | 15 | 1.607 | 33.5 |
| 15 | 86,000 | 78 | 1.636 | 31.1 |
| 16 | 148,000 | 92 | 1.637 | 28.6 |
| 17 | 126,000 | 80 | 1.611 | 34.6 |
| 18 | 173,000 | 92 | 1.608 | 35.4 |

Example 19

In a glass vessel equipped with a nitrogen inlet tube, a thermometer, a reflux condenser and an agitator were placed 35.7 g of bisphenol-A-diglycidyl ether (epoxy equivalent: 170 g/eq), 22.8 g of bisphenol A (0.1 mol) and 170 mL of N,N'-dimethylacetamide. In the atmosphere of nitrogen, the mixture was heated to 100° C. and then 0.58 g of triphenylphosphine was added. The mixture was gradually heated to 160° C. and stirred for 7 hours to complete the reaction. Then, the mixture was cooled to 50 to 60° C., 27 g of potassium carbonate was added and then 52 g of ethylthioethyl tosylate (0.2 mol) was added dropwise over 3 hours. The mixture was stirred at the temperature for additional 3 hours and then cooled to room temperature. The reaction mixture was added dropwise over 3 hours into vigorously stirred methanol (3 L), to precipitate a polymer. The polymer was filtered, washed with 1 L of methanol and then 2 L of distilled water, and then dried. The resulting polymer was dissolved in 200 g of tetrahydrofuran, and was added dropwise over 3 hours into vigorously stirred methanol (3 L), to precipitate a polymer. The polymer was filtered, washed with 1 L of methanol and then 2 L of distilled water, and then dried, to provide 69 g of the polymer, whose pendant-forming rate for hydroxy groups was 79%.

The sulfur-containing (thio)ether (co)polymer was clear and had a weight-average molecular weight of 201,500, a refractive index of 1.596 and an Abbe's number of 32.8. This polymer had an adequately high heat-distortion temperature of 120° C. or higher.

Examples 20 to 29

The polyhydroxy ether in Example 19 was subject to a pendant-forming reaction with one of the sulfur-containing agents shown in Table 5, to provide a sulfur-containing (thio)ether (co)polymer. When the polyhydroxy ether was inadequately reactive, its hydroxy group was converted into sodium salt, and then it was reacted with a sulfur-containing agent.

All of the resulting sulfur-containing (thio)ether (co) polymers had excellent optical properties and heat resistance as was for the polymer in Example 19. The results are also summarized in Table 5.

TABLE 5

| Example | Sulfur-containing agent | Polymer product | | Optical properties | |
|---|---|---|---|---|---|
| | | MW (PS converted) | P rate (%) | Refractive index ($n_d$) | Abbe's number |
| 20 | Br—(CH$_2$)$_3$SCH$_3$ | 203,100 | 63 | 1.597 | 32.5 |
| 21 | Br—(CH$_2$)$_2$SCH$_2$SCH$_3$ | 203,100 | 21 | 1.602 | 31.5 |
| 22 | 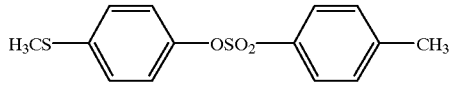 | 201,900 | 54 | 1.614 | 29.8 |
| 23 | 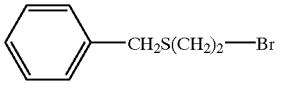 | 204,200 | 75 | 1.617 | 30.4 |
| 24 | 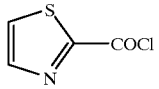 | 202,800 | 44 | 1.625 | 30.0 |
| 25 | 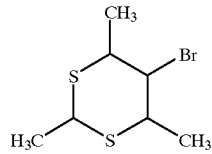 | 203,200 | 15 | 1.598 | 31.5 |

TABLE 5-continued

| Example | Sulfur-containing agent | Polymer product MW (PS converted) | P rate (%) | Optical properties Refractive index ($n_d$) | Abbe's number |
|---|---|---|---|---|---|
| 26 | 1,3-dithiane-2-COCl | 202,500 | 52 | 1.607 | 32.0 |
| 27 | 1,3-dithiane-2-COCl (6-membered) | 204,200 | 80 | 1.610 | 32.5 |
| 28 | camphor-SCH$_2$—Br | 203,000 | 16 | 1.595 | 32.1 |
| 29 | 1,3-dithiolane-2-CH$_2$—Br | 203,300 | 85 | 1.622 | 33.0 |

Example 30

In a glass vessel equipped with a nitrogen inlet tube, a thermometer, a reflux condenser and an agitator were placed 39.9 g of bisphenol-A-diglycidyl ether (epoxy equivalent: 190 g/eq), 22.8 g of bisphenol A (0.1 mol) and 150 mL of N,N'-dimethylacetamide. In the atmosphere of nitrogen, the mixture was heated to 100° C. and then 0.62 g of triphenylphosphine was added. The mixture was gradually heated to 160° C. and stirred for 5 hours to complete the reaction. Then, the mixture was cooled to 40 to 50° C., 40.4 g of triethylamine was added and then 46.2 g of 1,3-dithiorane-2-carboxyl chloride (0.25 mol) was added dropwise over 3 hours. The mixture was stirred at the temperature for additional 8 hours and then cooled to room temperature. The reaction mixture was added dropwise over 3 hours into vigorously stirred methanol (3 L), to precipitate a polymer. The polymer was filtered, washed with 1 L of methanol and then 2 L of distilled water, and then dried. The resulting polymer was dissolved in 200 g of tetrahydrofuran, and was added dropwise over 3 hours into vigorously stirred methanol (3 L), to precipitate a polymer. The polymer was filtered, washed with 1 L of methanol and then 2 L of distilled water, and then dried, to provide 78 g of the polymer, whose pendant-forming rate for hydroxy groups was 99%.

The sulfur-containing (thio)ether (co)polymer was clear and had a weight-average molecular weight of 126,000, a refractive index of 1.622 and an Abbe's number of 31.0. This polymer had an adequately high heat-distortion temperature of 120° C. or higher.

Examples 31 to 40

The polyhydroxy ether in Example 30 was subject to a pendant-forming reaction with one of the sulfur-containing agents shown in Table 6, to provide a sulfur-containing (thio)ether (co)polymer. When the polyhydroxy ether was inadequately reactive, its hydroxy group was converted into sodium salt, and then it was reacted with a sulfur-containing agent.

All of the resulting sulfur-containing (thio)ether (co) polymers had excellent optical properties and heat resistance as was for the polymer in Example 30. The results are also summarized in Table 6.

TABLE 6

| Example | Sulfur-containing agent | Polymer product MW (PS converted) | P rate (%) | Optical properties Refractive index ($n_d$) | Abbe's number |
|---|---|---|---|---|---|
| 31 | Br—CH$_2$SCH$_3$ | 122,500 | 99 | 1.603 | 31.8 |
| 32 | ClOC—C$_2$H$_4$SCH$_3$ | 123,000 | 90 | 1.592 | 32.8 |
| 33 | Br—C$_2$H$_4$SC$_2$H$_4$SCH$_3$ | 126,500 | 82 | 1.609 | 32.5 |

TABLE 6-continued

| Example | Sulfur-containing agent | Polymer product | | Optical properties | |
|---|---|---|---|---|---|
| | | MW (PS converted) | P rate (%) | Refractive index ($n_d$) | Abbe's number |
| 34 | (1,3-dithiane)-CH₂—Br | 125,200 | 65 | 1.611 | 32.2 |
| 35 | (1,3,5-trithiane)-CH₂—Br | 122,900 | 98 | 1.625 | 31.4 |
| 36 | (adamantyl)-SCH₂—Br | 121,600 | 30 | 1.595 | 33.2 |
| 37 | Ph—CH₂SCH₂—Br | 122,500 | 75 | 1.622 | 30.0 |
| 38 | H₃CS—(C₆H₃)(SCH₃)—OSO₂—(C₆H₄)—CH₃ | 126,300 | 81 | 1.630 | 29.5 |
| 39 | (thiophene)-COCl | 128,000 | 85 | 1.600 | 31.0 |
| 40 | (PhS)₂CH—COCl | 123,200 | 54 | 1.630 | 28.9 |

Example 41

In a glass vessel equipped with a nitrogen inlet tube, a thermometer, a reflux condenser and an agitator were placed the starting materials as described in Example 1, and the mixture was reacted at 160 to 170° C. for 5 hours under nitrogen atomosphere. Then, 2500 g of N,N'-dimethylacetamide was added and the mixture was cooled to room temperature. The reaction mixture was slowly added dropwise into vigorously stirred water (10 kg) over 5 hours, to precipitate a polymer. The polymer was filtered, washed with water and dried, to provide bisphenol-A-polyhydroxy ether. The bisphenol-A-polyhydroxy ether was dissolved in 5 kg of pyridine. To the solution at room temperature was added 343 g of tosyl chloride (1.8 mol) over 1 hour. The solution was stirred for 5 hours, stirred for additional 5 hours at 60 to 70° C. and then cooled to room temperature. The reaction solution was added dropwise to a mixture of water-methanol (3:1) (40 kg) over 3 hours, to precipitate a polymer. The polymer was filtered, washed with water and dried. The tosylated bisphenol-A-polyhydroxy ether was dissolved in 1 kg of N,N-dimethyl-2-imidazolidinone (DMi). To the mixture at 80 to 90° C. was added 126 g of methyl mercaptan sodium salt (1.8 mol) over 3 hours. The mixture was stirred at the temperature for additional 3 hours, and then cooled to room temperature. The reaction mixture was added to 6 L of vigorously stirred methanol over 3 hours, to precipitate a polymer. The polymer was filtered and washed with 1 L of methanol and then 2 L of distilled water. The resulting wet cake was stirred and dispersed in 2 L of distilled water, and the suspension was heated to 90 to 100° C. It was filtered, washed with 2 L of distilled water and dried, to provide 552 g of polymer, whose pendant-forming rate for hydroxy groups was 81%.

The sulfur-containing (thio)ether (co)polymer was clear and had a weight-average molecular weight of 231,000, a refractive index of 1.606 and an Abbe's number of 30.1. This polymer had an adequately high heat-distortion temperature of 120° C. or higher.

Examples 42 to 50

One of the aromatic diols shown in Table 7 and its diglycidyl ether was reacted as described in Example 41, to provide a tosylated polyhydroxy ether, which was then reacted with a -SNa-containing pendant-forming agent, to give a sulfur-containing (thio)ether (co)polymer. All of the (co)polymers had excellent optical properties and heat resistance as was for the polymer in Example 41. The results are summarized in Table 8.

TABLE 7

| Example | Aromatic diol | Aromatic diol diglycidyl ether | Sulfur-containing agent |
|---|---|---|---|
| 42 | hydroquinone | hydroquinone diglycidyl ether | $H_3CSC_2H_4-SNa$ |
| 43 | 3,5-bis(methylthio)-4-hydroxyphenyl substituted bisphenol | corresponding diglycidyl ether | 4-mercapto-tetrahydrothiopyran sodium salt |
| 44 | 2,6-dihydroxynaphthalene | 2,6-naphthalenediol diglycidyl ether | camphor-derived dithiol sodium salt |
| 45 | resorcinol | resorcinol diglycidyl ether | 1,3-dithiane-2-methyl sodium salt |
| 46 | 1,1-bis(4-hydroxyphenyl)-3,3,5-trimethylcyclohexane | corresponding diglycidyl ether | 2,4-bis(methylthio)thiophenol sodium salt |

TABLE 7-continued

| Example | Starting materials | | |
|---|---|---|---|
| | Aromatic diol | Aromatic diol diglycidyl ether | Sulfur-containing agent |
| 47 | | | |
| 48 | | | |
| 49 | | | |
| 50 | | | |

TABLE 8

| | Polymer product | | Optical properties | |
|---|---|---|---|---|
| Example | MW (PS converted) | P rate (%) | Refractive index ($n_d$) | Abbe's number |
| 42 | 182,000 | 72 | 1.621 | 34.6 |
| 43 | 117,000 | 53 | 1.678 | 31.8 |
| 44 | 146,000 | 45 | 1.602 | 34.6 |
| 45 | 107,000 | 88 | 1.644 | 31.5 |
| 46 | 135,000 | 75 | 1.680 | 31.9 |
| 47 | 112,000 | 66 | 1.625 | 32.3 |
| 48 | 125,000 | 88 | 1.678 | 33.1 |
| 49 | 96,000 | 45 | 1.662 | 39.6 |
| 50 | 131,000 | 55 | 1.666 | 28.6 |

Example 51

A polymer (495 g) was prepared as described in Example 41, except that 110 g of hydroquinone, 374 g of bisphenol-S-di-2-methylglycidyl ether and 64 g of isopropylthioethyl mercaptan sodium salt were used as an aromatic diol, a diglycidyl ether of an aromatic diol and a -SNa-containing pendant-forming agent, respectively. A pendant-forming rate was 15%. The sulfur-containing (thio)ether (co)polymer was clear and had a weight-average molecular weight of 177,000, a refractive index of 1.602 and an Abbe's number of 32.3. This polymer had an adequately high heat-distortion temperature of 120° C. or higher.

Examples 52 to 59

One of the aromatic diols shown in Table 9 and an diglycidyl ether of another aromatic diol were reacted as described in Example 51 to provide a tosylated polyhydroxy ether. The polyhydroxy ether was reacted with a -SNa-containing pendant-forming agent shown in Table 9, to provide a sulfur-containing (thio)ether (co)polymer. All of the resulting sulfur-containing (thio)ether (co)polymers had excellent optical properties and heat resistance as was for the polymer in Example 51. The results are summarized in Table 10.

TABLE 9

| Example | Starting materials | | |
|---|---|---|---|
| | Aromatic diol | Aromatic diol diglycidyl ether | Sulfur-containing agent |
| 52 | hydroquinone | resorcinol diglycidyl ether of 1,1-bis(4-hydroxyphenyl)-1-phenylethane derivative | H$_3$CSC$_2$H$_4$SC$_2$H$_4$—SNa |
| 53 | 1,1-bis(4-hydroxyphenyl)cyclohexane derivative | bis(4-glycidyloxyphenyl) sulfide (methyl-substituted) | benzyl-CH$_2$SCH$_2$SNa |
| 54 | 2,2-bis(3,5-dibromo-4-hydroxyphenyl)propane | 6,6'-bis(glycidyloxy)-3,3,3',3'-tetramethyl-1,1'-spirobiindane | H$_3$CSC$_2$H$_4$—[dithiane]—CH$_2$SNa (50:50) |
| 55 | 4,4'-dihydroxydiphenylacetonitrile | resorcinol bis(2-methylglycidyl) ether | trimethyl-dithiane-C$_2$H$_4$SNa |
| 56 | 1,1-bis(4-hydroxyphenyl)-2-methylpropane | 4,4'-biphenol bis(2-methylglycidyl) ether | thiazole-2-COSNa |

TABLE 9-continued

| Example | Starting materials | | |
|---|---|---|---|
| | Aromatic diol | Aromatic diol diglycidyl ether | Sulfur-containing agent |
| 57 | | | |
| 58 | | | |
| 59 | | | |

TABLE 10

| Example | Polymer product | | Optical properties | |
|---|---|---|---|---|
| | MW (PS converted) | P rate (%) | Refractive index ($n_d$) | Abbe's number |
| 52 | 183,000 | 81 | 1.633 | 32.0 |
| 53 | 142,000 | 62 | 1.621 | 31.3 |
| 54 | 151,000 | 100 | 1.666 | 32.5 |
| 55 | 212,000 | 70 | 1.625 | 33.4 |
| 56 | 173,000 | 61 | 1.641 | 31.1 |
| 57 | 132,000 | 18 | 1.610 | 33.4 |
| 58 | 86,000 | 77 | 1.652 | 30.4 |
| 59 | 148,000 | 98 | 1.656 | 27.9 |

Example 60

The starting materials in Example 19 were reacted as described in the example, the reaction mixture was cooled to room temperature and 202 g of triethylamine was added. To the solution at room temperature was added 477 g of tosyl chloride (2.5 mol) over 1 hour, and the solution was stirred at room temperature for additional 10 hours to complete the tosylation reaction. The reaction mixture was added dropwise to a vigorously stirred mixture of water-methanol (4:1) (3 L) over 3 hours, to precipitate a polymer. The polymer was filtered, washed with 1 L of water and dried, to provide a tosylated bisphenol-A-polyhydroxy ether.

The tosylated bisphenol-A-polyhydroxy ether was dissolved in 2 kg of N,N-dimethyl-2-imidazolidinone (DMi). To the mixture at room temperature was added 345 g of cyclohexanethiol sodium salt (2.5 mol), and the mixture was stirred at room temperature for 12 hours, to complete the reaction. The reaction mixture was added to 10 L of vigorously stirred methanol over 3 hours, to precipitate a polymer. The polymer was filtered and washed with 2 L of methanol and then 3 L of distilled water. The resulting wet cake was stirred and dispersed in 2.5 kg of distilled water, and the suspension was heated to 90 to 100° C. It was filtered, washed with 2 L of distilled water and dried, to provide 711 g of polymer, whose cyclohexylthio-substitution rate (pendant-forming rate) for hydroxy groups was 85%.

The sulfur-containing (thio)ether (copolymer was clear and had a weight-average molecular weight of 206,000, a refractive index of 1.595 and an Abbe's number of 33.5. This polymer had an adequately high heat-distortion temperature of 120° C. or higher.

Examples 61 to 70

The tosylated bisphenol-A-polyhydroxy ether in Example 60 was subject to pendant-forming reaction with one of the sulfur-containing agents shown in Table 11, as described in Example 60, to provide a sulfur-containing (thio)ether (copolymer. All of the polymers had excellent optical properties and heat resistance as was for the polymer in Example 60. The results are also summarized in Table 11.

TABLE 11

| Example | Sulfur-containing agent | Polymer product | | Optical properties | |
|---|---|---|---|---|---|
| | | MW (PS converted) | P rate (%) | Refractive index ($n_d$) | Abbe's number |
| 61 | (1,3-dithiolane)-CH$_2$SNa | 202,500 | 90 | 1.640 | 30.9 |
| 62 | Ph-CH$_2$SCH$_2$SNa | 205,200 | 92 | 1.640 | 29.1 |
| 63 | (1,4-dithiane-2-yl)-CH$_2$SNa | 204,800 | 89 | 1.634 | 31.5 |
| 64 | (1,3,5-trithiane-2-yl)-CH$_2$SNa | 206,100 | 87 | 1.642 | 30.9 |
| 65 | H$_3$CSC$_2$H$_4$—SNa | 205,300 | 98 | 1.623 | 31.4 |
| 66 | H$_3$CSC$_2$H$_4$SC$_2$H$_4$—SNa | 203,900 | 85 | 1.628 | 31.6 |

TABLE 11-continued

| | | Polymer product | | Optical properties | |
| --- | --- | --- | --- | --- | --- |
| Example | Sulfur-containing agent | MW (PS converted) | P rate (%) | Refractive index ($n_d$) | Abbe's number |
| 67 | 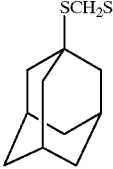 | 205,000 | 88 | 1.603 | 34.8 |
| 68 | 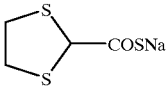 | 204,000 | 92 | 1.636 | 30.8 |
| 69 | 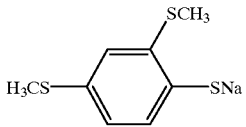 | 206,200 | 86 | 1.649 | 28.8 |
| 70 | 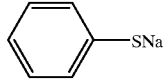 | 205,700 | 90 | 1.635 | 28.5 |

Example 71

The starting materials in Example 30 were reacted as described in the example, the reaction mixture was cooled to room temperature and 16 g of pyridine was added. To the solution at room temperature was added 11.4 g of tosyl chloride (0.06 mol) over 1 hour, and the solution was stirred at room temperature for additional 10 hours to complete the tosylation reaction. The reaction mixture was added dropwise to a vigorously stirred mixture of water-methanol (4:1) (3 L) over 3 hours, to precipitate a polymer. The polymer was filtered, washed with 1 L of water and dried, to provide a tosylated bisphenol-A-polyhydroxy ether.

The tosylated bisphenol-A-polyhydroxy ether was dissolved in 150 g of N,N-dimethyl-2-imidazolidinone (DMi). To the mixture at room temperature was added 7.9 g of thiophenol sodium salt (0.06 mol), and the mixture was stirred at room temperature for 13 hours, to complete the reaction.

The reaction mixture was added to 1 L of vigorously stirred methanol over 3 hours, to precipitate a polymer. The polymer was filtered and washed with 200 mL of methanol and then 400 mL of distilled water. The resulting wet cake was stirred and dispersed in 250 mL of distilled water, and the suspension was heated to 90 to 100° C. It was filtered, washed with 200 mL of distilled water and dried, to provide 60 g of polymer, whose phenylthio-substitution rate (pendant-forming rate) for hydroxy groups was 25%.

The sulfur-containing (thio)ether (co)polymer was clear and had a weight-average molecular weight of 142,000, a refractive index of 1.600 and an Abbe's number of 30.5. This polymer had an adequately high heat-distortion temperature of 120° C. or higher.

Examples 72 to 76

The tosylated bisphenol-A-polyhydroxy ether in Example 71 was subject to pendant-forming reaction with one of the sulfur-containing agents shown in Table 12, as described in Example 71, to provide a sulfur-containing (thio)ether (co) polymer. All of the polymers had excellent optical properties and heat resistance as was for the polymer in Example 71. The results are also summarized in Table 12.

TABLE 12

| | | Polymer product | | Optical properties | |
| --- | --- | --- | --- | --- | --- |
| Example | Sulfur-containing agent | MW (PS converted) | P rate (%) | Refractive index ($n_d$) | Abbe's number |
| 72 | $C_2H_5$—SNa | 140,900 | 20 | 1.600 | 31.2 |
| 73 | $H_3CSC_2H_4$—SNa | 143,500 | 22 | 1.605 | 31.2 |

TABLE 12-continued

| | | Polymer product | | Optical properties | |
|---|---|---|---|---|---|
| Example | Sulfur-containing agent | MW (PS converted) | P rate (%) | Refractive index ($n_d$) | Abbe's number |
| 74 | [structure: 1,3-dithiane-2-SNa] | 143,100 | 18 | 1.609 | 31.1 |
| 75 | [structure: thiazoline-2-SNa] | 143,400 | 15 | 1.610 | 30.6 |
| 76 | $H_3C$—[phenyl]—SNa | 141,700 | 26 | 1.607 | 30.3 |

Example 77

A tosylated bisphenol-A-polyhydroxy ether was prepared as described in Example 60, except that 30.5 g of tosyl chloride (0.16 mol) was used.

The tosylated bisphenol-A-polyhydroxy ether was dissolved in 250 g of N,N-dimethyl-2-imidazolidinone (DMi). To the mixture at room temperature was added 20.8 g of methylthioethyl mercaptan sodium salt (0.16 mol), and the mixture was stirred at room temperature for 15 hours, to complete the reaction.

The reaction mixture was added to 1.5 L of vigorously stirred methanol over 3 hours, to precipitate a polymer. The polymer was filtered and washed with 250 mL of methanol and then 400 mL of distilled water. The resulting wet cake was stirred and dispersed in 250 mL of distilled water, and the suspension was heated to 90 to 100° C. It was filtered, washed with 200 mL of distilled water and dried, to provide 65 g of polymer, whose methylthioethylthio-substitution rate (pendant-forming rate) for hydroxy groups was 75%.

The sulfur-containing (thio)ether (co)polymer was clear and had a weight-average molecular weight of 182,500, a refractive index of 1.618 and an Abbe's number of 31.2. This polymer had an adequately high heat-distortion temperature of 120° C. or higher.

Examples 78 to 82

The tosylated bisphenol-A-polyhydroxy ether in Example 77 was subject to pendant-forming reaction with one of the sulfur-containing agents shown in Table 13, as described in Example 77, to provide a sulfur-containing (thio)ether (co) polymer. All of the polymers had excellent optical properties and heat resistance as was for the polymer in Example 77. The results are also summarized in Table 13.

TABLE 13

| | | Polymer product | | Optical properties | |
|---|---|---|---|---|---|
| Example | Sulfur-containing agent | MW (PS converted) | P rate (%) | Refractive index ($n_d$) | Abbe's number |
| 78 | $(C_2H_5S)_2HC$—COSNa | 181,900 | 68 | 1.610 | 31.6 |
| 79 | [phenyl]—$CH_2S(CH_2)_2SNa$ | 182,700 | 63 | 1.630 | 30.0 |
| 80 | [tetrahydrothiopyran]—SNa | 182,500 | 71 | 1.618 | 32.1 |
| 81 | [1,3-dithiolane-2-]$CH_2SNa$ | 181,000 | 74 | 1.634 | 30.9 |

TABLE 13-continued

| Example | Sulfur-containing agent | Polymer product | | Optical properties | |
| | | MW (PS converted) | P rate (%) | Refractive index ($n_d$) | Abbe's number |
| --- | --- | --- | --- | --- | --- |
| 82 | 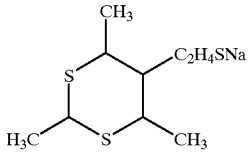 | 183,000 | 75 | 1.600 | 32.6 |

Example 83

To 350 g of N,N'-dimethylacetamide were added 260 g of 2,2-bis(4-mercaptophenyl)propane (1.0 mol), 340 g of bisphenol-A-diglycidyl ether (1.0 mol) and 1 g of triphenylphosphine, and the mixture was reacted at 100° C. for 5 hours under nitrogen atomosphere. Then, 2500 g of N,N'-dimethylacetamide was added and the mixture was cooled to room temperature. The reaction mixture was slowly added dropwise into vigorously stirred water (10 kg) over 5 hours, to precipitate a polymer. The polymer was filtered, washed with water and dried. The resulting polyhydroxy-thio,oxy-ether polymer was dissolved in 5 kg of pyridine. To the solution at room temperature was added 343 g of tosyl chloride (1.8 mol) over 1 hour. The solution was stirred for 5 hours, stirred for additional 5 hours at 60 to 70° C. and then cooled to room temperature.

The reaction solution was added dropwise to a mixture of water-methanol (3:1) (40 kg) over 3 hours, to precipitate a polymer. The polymer was filtered, washed with water and dried. The tosylated polyhydroxy-thio,oxy-ether was dissolved in 1 kg of N,N-dimethyl-2-imidazolidinone (DMi). To the mixture at 80 to 90° C. was added 126 g of methyl mercaptan sodium salt (1.8 mol) over 3 hours. The mixture was stirred at the temperature for additional 3 hours, and then cooled to room temperature. The reaction mixture was added to 6 L of vigorously stirred methanol over 3 hours, to precipitate a polymer. The polymer was filtered and washed with 1 L of methanol and then 2 L of distilled water. The resulting wet cake was stirred and dispersed in 2 L of distilled water, and the suspension was heated to 90 to 100° C.

It was filtered, washed with 2 L of distilled water and dried, to provide 546 g of polymer, whose methylthio-substitution rate (hereinafter, referred to a "pendant-forming rate") for hydroxy groups was 82%.

The sulfur-containing (thio)ether (co)polymer was clear and had a weight-average molecular weight of 189,000, a refractive index of 1.637 and an Abbe's number of 30.0. This polymer had an adequately high heat-distortion temperature of 120° C. or higher.

Examples 84 to 103

One of the dithiols shown in Table 14 and a diglycidyl ether having the same basic structure as the dithiol were reacted as described in Example 83, to provide a tosylated polyhydroxy-thio,oxy-ether, which was then reacted with a pendant-forming agent (Na salt), to give a sulfur-containing (thio)ether (co)polymer. All of the (co)polymers had excellent optical properties and heat resistance as was for the polymer in Example 83. The polymer products and measurements for their optical properties are summarized in Table 15.

TABLE 14

| Example | Starting materials | | |
|---|---|---|---|
| | Dithiol | Diol diglycidyl ether | Sulfur-containing agent |
| 84 | | | $H_3CSC_2H_4-SNa$ |
| 85 | | | |
| 86 | | | |
| 87 | | | |
| 88 | | | |

TABLE 14-continued

| Example | Starting materials | | |
|---|---|---|---|
| | Dithiol | Diol diglycidyl ether | Sulfur-containing agent |
| 89 | | | |
| 90 | | | |
| 91 | | | |
| 92 | | | |
| 93 | | | |

TABLE 14-continued

| Example | Starting materials | | |
|---|---|---|---|
| | Dithiol | Diol diglycidyl ether | Sulfur-containing agent |
| 94 | | | |
| 95 | | | |
| 96 | | | |
| 97 | | | |
| 98 | | | |

TABLE 14-continued

| Example | Starting materials | | |
|---|---|---|---|
| | Dithiol | Diol diglycidyl ether | Sulfur-containing agent |
| 99 | | | |
| 100 | | | |
| 101 | | | |

TABLE 14-continued

| Example | Starting materials | | |
|---|---|---|---|
| | Dithiol | Diol diglycidyl ether | Sulfur-containing agent |
| 102 | 2-mercapto-4-mercaptomethyl thiazole | bis-glycidyl ether of 2,5-dimethyl-2,5-dihydroxy... cyclohexanediol | 4-(2-(4-hydroxyphenyl)propan-2-yl)phenol sodium salt |
| 103 | 2,2'-thiobis(ethanethiol) | spirobiindane bis-glycidyl ether | H₃C—SK |

TABLE 15

| Example | Polymer product MW (PS converted) | P rate (%) | Optical properties Refractive index ($n_d$) | Abbe's number |
|---|---|---|---|---|
| 84 | 173,000 | 75 | 1.669 | 30.6 |
| 85 | 123,000 | 63 | 1.634 | 29.5 |
| 86 | 151,000 | 54 | 1.615 | 33.9 |
| 87 | 132,000 | 81 | 1.681 | 30.9 |
| 88 | 122,000 | 68 | 1.637 | 31.1 |
| 89 | 181,000 | 88 | 1.649 | 29.5 |
| 90 | 162,000 | 92 | 1.648 | 30.7 |
| 91 | 145,000 | 35 | 1.625 | 28.9 |
| 92 | 193,000 | 57 | 1.678 | 28.4 |
| 93 | 152,000 | 77 | 1.574 | 37.8 |
| 94 | 172,000 | 80 | 1.659 | 30.7 |
| 95 | 155,000 | 71 | 1.638 | 29.8 |
| 96 | 182,000 | 100 | 1.646 | 31.5 |
| 97 | 135,000 | 44 | 1.600 | 32.1 |
| 98 | 201,000 | 65 | 1.667 | 27.7 |
| 99 | 143,000 | 22 | 1.614 | 31.7 |
| 100 | 113,000 | 67 | 1.640 | 29.1 |
| 101 | 154,000 | 97 | 1.646 | 27.1 |
| 102 | 118,000 | 33 | 1.602 | 38.8 |
| 103 | 132,000 | 51 | 1.611 | 35.1 |

Example 104

To 350 g of N,N'-dimethylacetamide were added 260 g of 2,2-bis(4-mercaptophenyl)propane (1.0 mol), 340 g of bisphenol-A-diglycidyl ether (1.0 mol) and 1 g of triphenylphosphine, and the mixture was reacted at 100 to 110° C. for 5 hours under nitrogen atomsphere. Then, 2500 g of N,N'-dimethylacetamide was added and the mixture was cooled to room temperature. The reaction mixture was slowly added dropwise into vigorously stirred water (10 kg) over 5 hours, to precipitate a polymer. The polymer was filtered, washed with water and dried.

The resulting polyhydroxy-thio,oxy-ether was added to a vigorously stirred solution of thionyl bromide (430 g, 2.1 mol) and pyridine (2.0 g) in chlorobenzene (4 kg) over 3 hours, and the mixture was stirred for 5 hours, stirred for additional 5 hours at 40 to 50° C. and then cooled to room temperature. The unreacted thionyl bromide in the reaction solution was evaporated at a reduced pressure and the mixture was added dropwise to 40 kg of methanol over 3 hours. The precipitated polymer was filtered, washed with water and dried. The polybromo-thiooxy-ether was dissolved in 1 kg of N,N-dimethyl-2-imidazolidinone (DMi). To the mixture at 80 to 90° C. was added 170 g of ethyl mercaptan sodium salt (2.0 mol) over 3 hours. The mixture was stirred at 130 to 140° C. for additional 5 hours, and then cooled to room temperature. The reaction mixture was added to 10 L of vigorously stirred methanol over 3 hours, to precipitate a polymer. The polymer was filtered and washed with 1 L of methanol and then 2 L of distilled water. The resulting wet cake was stirred and dispersed in 2 L of distilled water, and the suspension was heated to 90 to 100° C. It was filtered, washed with 2 L of distilled water and dried, to provide 615 g of polymer, whose ethylthio-substitution rate (pendant-forming rate) for bromines was 94%. The sulfur-containing (thio)ether (co)polymer was clear and had a weight-average molecular weight of 193,000, a refractive index of 1.631 and an Abbe's number of 30.1. This polymer had an adequately high heat-distortion temperature of 120° C. or higher.

Examples 105 to 108

One of the dithiols shown in Table 16 and a diglycidyl ether having a different basic structure from the dithiol were reacted as described in Example 104, to provide a polybromo-thio,oxy-ether, which was then reacted with a pendant-forming agent (Na or K salt), to give a sulfur-containing (thio)ether (co)polymer. All of the (co)polymers had excellent optical properties and heat resistance as was for the polymer in Example 64. The polymer products and measurements for their optical properties are summarized in Table 17.

TABLE 16
| Example | Starting materials | | |
|---|---|---|---|
| | Dithiol | Diol diglycidyl ether | Sulfur-containing agent |
| 105 | 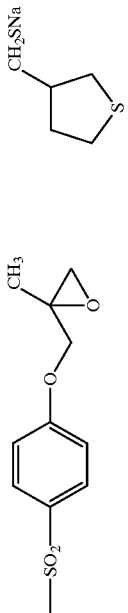 |  | 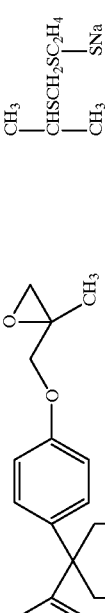 |
| 106 | 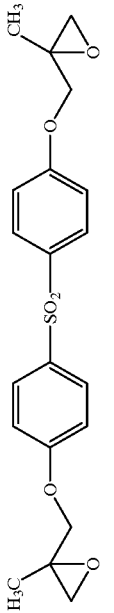 | 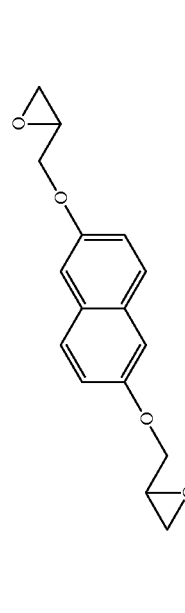 | 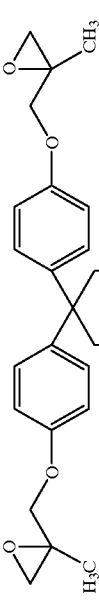 |
| 107 | 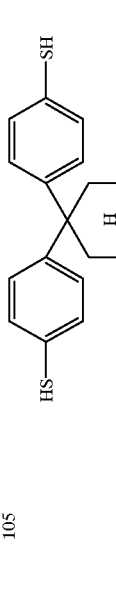 | 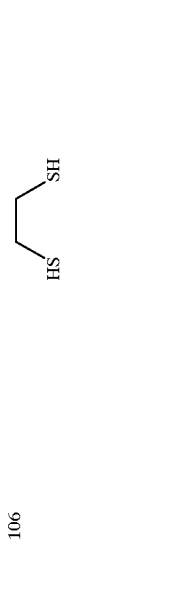 | 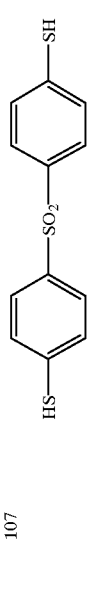 |
| 108 |  |  |  |

TABLE 17

| Example | Polymer product | | Optical properties | |
| --- | --- | --- | --- | --- |
|  | MW (PS converted) | P rate (%) | Refractive index ($n_d$) | Abbe's number |
| 105 | 192,000 | 83 | 1.635 | 32.3 |
| 106 | 175,000 | 72 | 1.577 | 37.5 |
| 107 | 198,000 | 95 | 1.615 | 32.6 |
| 108 | 184,000 | 65 | 1.621 | 35.6 |

Example 109

In a glass vessel equipped with a nitrogen inlet tube, a thermometer, a reflux condenser and an agitator were placed 31.3 g of 4,4'-diglycidyloxybiphenyl (epoxy equivalent: 149.2 g/eq), 22.8 g of bisphenol A (0.1 mol) and 150 mL of N,N'-dimethylacetamide. The mixture was heated to 100° C. in an atmosphere of nitrogen and 0.54 g of triphenylephosphine was added. The mixture was gradually heated to 160° C. and stirred for 5 hours to complete the reaction. The mixture was cooled to 80 to 90° C., 40.4 g of triethylamine was added and then 50.1 g of 1,3,5-trithiane-2-carboxyl chloride (0.25 mol) was added dropwise over 3 hours. The reaction mixture was stirred at the temperature for additional 3 hours, and then cooled to room temperature. The reaction mixture was added dropwise over 3 hours into vigorously stirred methanol (3 L), to precipitate a polymer. The polymer was filtered, washed with 1 L of methanol and then 2 L of distilled water, and then dried. The resulting polymer was dissolved in 200 g of tetrahydrofuran, and was added dropwise over 3 hours into vigorously stirred methanol (3 L), to precipitate a polymer. The polymer was filtered, washed with 1 L of methanol and then 2 L of distilled water, and then dried, to provide 76 g of the polymer, whose pendant-forming rate for hydroxy groups was 98%. The sulfur-containing (thio)ether (co)polymer was clear and had a weight-average molecular weight of 186,000, a refractive index of 1.635 and an Abbe's number of 30.9. This polymer had an adequately high heat-distortion temperature of 120° C. or higher.

Examples 110 to 121

The polyhydroxy ether in Example 109 was subject to a pendant-forming reaction with one of the sulfur-containing agents shown in Table 18, to provide a sulfur-containing (thio)ether (co)polymer. When the polyhydroxy ether was inadequately reactive, its hydroxy group was converted into sodium salt, and then it was reacted with a sulfur-containing agent. All of the polymers had excellent optical properties and heat resistance as was for the polymer in Example 109. The results are also summarized in Table 18.

TABLE 18

| Example | Sulfur-containing agent | Polymer product | | Optical properties | |
| --- | --- | --- | --- | --- | --- |
|  |  | MW (PS converted) | P rate (%) | Refractive index ($n_d$) | Abbe's number |
| 110 | [1,3-dithiane-CH₂Br] | 192,000 | 96 | 1.627 | 31.9 |
| 111 | [phenyl-CH₂SCH₂Br] | 187,000 | 85 | 1.636 | 29.2 |
| 112 | [thiazole-COCl] | 182,000 | 73 | 1.642 | 28.8 |
| 113 | $H_3CSC_2H_4SC_2H_4$—Br | 186,000 | 55 | 1.619 | 31.5 |
| 114 | [1,3-dithiolane-COCl] | 189,000 | 62 | 1.633 | 31.7 |
| 115 | [adamantyl-SCH₂Br] | 187,000 | 52 | 1.602 | 33.8 |
| 116 | $(C_2H_5S)_2HC$—COCl | 185,000 | 48 | 1.623 | 31.2 |

TABLE 18-continued

| Example | Sulfur-containing agent | Polymer product MW (PS converted) | P rate (%) | Refractive index ($n_d$) | Abbe's number |
|---|---|---|---|---|---|
| 117 | 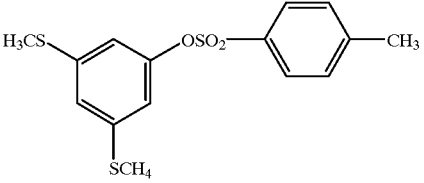 | 196,000 | 99 | 1.649 | 28.7 |
| 118 | 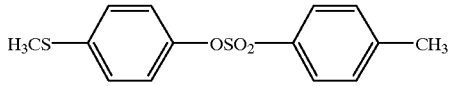 | 195,000 | 30 | 1.622 | 29.6 |
| 119 | 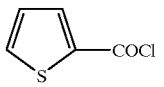 | 188,000 | 92 | 1.619 | 30.2 |
| 120 | 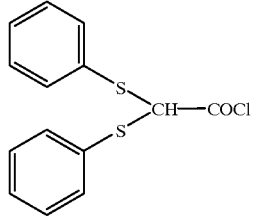 | 185,000 | 56 | 1.650 | 28.6 |
| 121 | 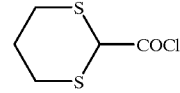 | 188,000 | 82 | 1.630 | 31.9 |

Example 122

In a glass vessel equipped with a nitrogen inlet tube, a thermometer, a reflux condenser and an agitator were placed 39.9 g of bisphenol-A-diglycidyl ether (epoxy equivalent: 190 g/eq), 18.6 g of 4,4'-dihydroxybiphenyl (0.1 mol) and 170 mL of N,N'-dimethylacetamide. The mixture was heated to 100° C. in an atmosphere of nitrogen and 0.60 g of triphenylphosphine was added. The mixture was gradually heated to 160° C. and stirred for 5 hours to complete the reaction. The mixture was cooled to 130 to 140° C., 27 g of potassium carbonate was added and then 57 g of methylthioethyl tosylate (0.25 mol) was added dropwise over 3 hours. The reaction mixture was stirred at the temperature for additional 3 hours, and then cooled to room temperature. The reaction mixture was added dropwise over 3 hours into vigorously stirred methanol (3 L), to precipitate a polymer. The polymer was filtered, washed with 1 L of methanol and then 2 L of distilled water, and then dried. The resulting polymer was dissolved in 200 g of tetrahydrofuran, and was added dropwise over 3 hours into vigorously stirred methanol (3 L), to precipitate a polymer. The polymer was filtered, washed with 1 L of methanol and then 2 L of distilled water, and then dried, to provide 68 g of the polymer, whose pendant-forming rate for hydroxy groups was 99%. The sulfur-containing (thio)ether (co)polymer was clear and had a weight-average molecular weight of 154,000, a refractive index of 1.610 and an Abbe's number of 31.9.

This polymer had an adequately high heat-distortion temperature of 120° C. or higher.

Examples 123 to 126

The polyhydroxy ether in Example 122 was subject to a pendant-forming reaction with one of the sulfur-containing agents shown in Table 19, to provide a sulfur-containing (thio)ether (co)polymer. When the polyhydroxy ether was inadequately reactive, its hydroxy group was converted into sodium salt, and then it was reacted with a sulfur-containing agent. All of the polymers had excellent optical properties and heat resistance as was for the polymer in Example 122. The results are also summarized in Table 19.

TABLE 19

| Example | Sulfur-containing agent | Polymer product MW (PS converted) | P rate (%) | Optical properties Refractive index ($n_d$) | Abbe's number |
|---|---|---|---|---|---|
| 123 | C₂H₅—S\CH—COCl /C₂H₅—S | 165,000 | 83 | 1.625 | 31.7 |
| 124 | ⌬—CH₂S—CH₂Br | 169,000 | 12 | 1.618 | 30.0 |
| 125 | (thiophene)—COCl | 161,000 | 98 | 1.622 | 30.2 |
| 126 | (1,3-dithiane)—CH₂Br | 168,000 | 21 | 1.621 | 30.3 |

Example 127

In a glass vessel equipped with a nitrogen inlet tube, a thermometer, a reflux condenser and an agitator were placed 37.2 g of 4,4'-diglycidyloxy-3,5,3',5'-tetramethyl-biphenyl (epoxy equivalent: 177.2 g/eq), 22.8 g of bisphenol A and 170 mL of N,N'-dimethylacetamide. The mixture was heated to 100° C. in an atmosphere of nitrogen and 0.60 g of triphenylphosphine was added. The mixture was gradually heated to 160° C. and stirred for 5 hours to complete the reaction. The mixture was cooled to 130 to 140° C., 27 g of potassium carbonate was added and then 35 g of ethylthioethyl tosylate was added dropwise over 3 hours. The reaction mixture was stirred at the temperature for additional 3 hours, and then cooled to room temperature. The reaction mixture was added dropwise over 3 hours into vigorously stirred methanol (3 L), to precipitate a polymer. The polymer was filtered, washed with 1 L of methanol and then 2 L of distilled water, and then dried. The resulting polymer was dissolved in 200 g of tetrahydrofuran, and was added dropwise over 3 hours into vigorously stirred methanol (3 L), to precipitate a polymer. The polymer was filtered, washed with 1 L of methanol and then 2 L of distilled water, and then dried, to provide 63 g of the polymer, whose pendant-forming rate for hydroxy groups was 59%. The sulfur-containing (thio)ether (co)polymer was clear and had a weight-average molecular weight of 209,000, a refractive index of 1.585 and an Abbe's number of 32.6.

This polymer had an adequately high heat-distortion temperature of 120° C. or higher.

Examples 128 to 131

The polyhydroxy ether in Example 127 was subject to a pendant-forming reaction with one of the sulfur-containing agents shown in Table 20, to provide a sulfur-containing (thio)ether (co)polymer. When the polyhydroxy ether was inadequately reactive, its hydroxy group was converted into sodium salt, and then it was reacted with a sulfur-containing agent. All of the polymers had excellent optical properties and heat resistance as was for the polymer in Example 127. The results are also summarized in Table 20.

TABLE 20

| Example | Sulfur-containing agent | Polymer product MW (PS converted) | P rate (%) | Optical properties Refractive index ($n_d$) | Abbe's number |
|---|---|---|---|---|---|
| 128 | H₃CS—(3,5-bis(SCH₃)phenyl)—OSO₂—C₆H₄—CH₃ | 213,000 | 62 | 1.609 | 30.2 |
| 129 | H₃CS—C₆H₄—OSO₂—C₆H₄—CH₃ | 215,000 | 75 | 1.603 | 29.6 |

TABLE 20-continued

| Example | Sulfur-containing agent | Polymer product MW (PS converted) | P rate (%) | Optical properties Refractive index ($n_d$) | Abbe's number |
|---|---|---|---|---|---|
| 130 | (1,3-dithiolane-2-carbonyl chloride) | 209,000 | 98 | 1.602 | 32.8 |
| 131 | (2-(bromomethyl)-1,3,5-trithiane) | 221,000 | 96 | 1.610 | 31.7 |

Example 132

In a glass vessel equipped with a nitrogen inlet tube, a thermometer, a reflux condenser and an agitator were placed 38.7 g of bisphenol-A-2-methylglycidyl ether (epoxy equivalent: 184.3 g/eq), 50.1 g of 4,4'-dihydroxy-3,5,3',5'-tetrabromo-biphenyl and 250 mL of N,N'-dimethylacetamide. The mixture was heated to 100° C. in an atmosphere of nitrogen and 0.93 g of triphenylphosphine was added. The mixture was gradually heated to 160° C. and stirred for 4 hours. Then the mixture was cooled to an internal temperature of 80 to 90° C., 47 g of pyridine was added and then 70 g of 4-methylthiophenyl tosylate was added over 3 hours. The reaction mixture was stirred at the temperature for additional 3 hours, and then cooled to room temperature. The reaction mixture was added dropwise over 3 hours into vigorously stirred methanol (3 L), to precipitate a polymer. The polymer was filtered, washed with 1 L of methanol and then 2 L of distilled water, and then dried. The resulting polymer was dissolved in 200 g of tetrahydrofuran, and was added dropwise over 3 hours into vigorously stirred methanol (3 L), to precipitate a polymer. The polymer was filtered, washed with 1 L of methanol and then 2 L of distilled water, and then dried, to provide 93 g of the polymer, whose pendant-forming rate for hydroxy groups was 32%. The sulfur-containing (thio)ether (co)polymer was clear and had a weight-average molecular weight of 210, 000, a refractive index of 1.631 and an Abbe's number of 30.

This polymer had an adequately high heat-distortion temperature of 120° C. or higher.

Examples 133 to 136

The polyhydroxy ether in Example 132 was subject to a pendant-forming reaction with one of the sulfur-containing agents shown in Table 21, to provide a sulfur-containing (thio)ether (co)polymer. When the polyhydroxy ether was inadequately reactive, its hydroxy group was converted into sodium salt, and then it was reacted with a sulfur-containing agent. All of the polymers had excellent optical properties and heat resistance as was for the polymer in Example 132. The results are also summarized in Table 21.

TABLE 21

| Example | Sulfur-containing agent | Polymer product MW (PS converted) | P rate (%) | Optical properties Refractive index ($n_d$) | Abbe's number |
|---|---|---|---|---|---|
| 133 | (1,3-dithiane-2-carbonyl chloride) | 212,000 | 90 | 1.630 | 31.8 |
| 134 | (thiazole-2-carbonyl chloride) | 217,000 | 45 | 1.651 | 29.3 |
| 135 | (1,3,5-trithiane-2-carbonyl chloride) | 218,000 | 98 | 1.640 | 30.9 |
| 136 | ($H_3CS$—C$_6$H$_4$—OSO$_2$—C$_6$H$_4$—CH$_3$) | 216,000 | 32 | 1.632 | 30.0 |

Example 137

In a glass vessel equipped with a nitrogen inlet tube, a thermometer, a reflux condenser and an agitator were placed 313 g of 4,4'-diglycidyloxybiphenyl (epoxy equivalent: 149.2 g/eq), 228 g of bisphenol A (1 mol) and 1.5 kg of N,N'-dimethylacetamide. The mixture was heated to 100° C. in an atmosphere of nitrogen and 5.4 g of triphenylphosphine was added. The mixture was gradually heated to 160° C. and stirred for 5 hours to complete the reaction. Then the mixture was cooled to room temperature, and 404 g of triethylamine was added. To the solution at room temperature was added 477 g of tosyl chloride (2.5 mol) over 1 hour, and the solution was stirred at room temperature for additional 10 hours to complete the tosylation reaction. The reaction mixture was added dropwise to a vigorously stirred mixture of water-methanol (4:1) (30 L) over 3 hours, to precipitate a polymer. The polymer was filtered, washed with 10 L of water and dried, to provide a tosylated bisphenol-A-biphenyl-polyhydroxy ether.

The tosylated bisphenol-A-biphenyl-polyhydroxy ether was dissolved in 1.5 kg of N,N-dimethyl-2-imidazolidinone (DMi). To the mixture at room temperature was added 330 g of thiophenol sodium salt (2.5 mol), and the mixture was stirred at room temperature for 12 hours, to complete the reaction. The reaction mixture was added to 15 L of vigorously stirred methanol over 3 hours, to precipitate a polymer. The polymer was filtered and washed with 2 L of methanol and then 3 L of distilled water. The resulting wet cake was stirred and dispersed in 2 L of distilled water, and the suspension was heated to 90 to 100° C. It was filtered, washed with 4 L of distilled water and dried, to provide 690 g of polymer, whose phenylthio-substitution rate (pendant-forming rate) for hydroxy groups was 90%.

The sulfur-containing (thio)ether (co)polymer was clear and had a weight-average molecular weight of 196,000, a refractive index of 1.648 and an Abbe's number of 27.5. This polymer had an adequately high heat-distortion temperature of 120° C. or higher.

Examples 138 to 146

The tosylated bisphenol-A-biphenyl-polyhydroxy ether in Example 137 was subject to pendant-forming reaction with one of the sulfur-containing agents shown in Table 22, as described in Example 137, to provide a sulfur-containing (thio)ether (co)polymer. All of the polymers had excellent optical properties and heat resistance as was for the polymer in Example 137. The results are also summarized in Table 22.

TABLE 22

| Example | Sulfur-containing agent | Polymer product MW (PS converted) | P rate (%) | Refractive index ($n_d$) | Abbe's number |
|---|---|---|---|---|---|
| 138 | [cyclic structure with N, S]—SNa | 192,000 | 91 | 1.657 | 27.9 |
| 139 | $H_3CSC_2H_4SC_2H_4$—SNa | 197,000 | 95 | 1.642 | 31.1 |
| 140 | [dithiane ring]—$CH_2SNa$ | 189,000 | 89 | 1.647 | 30.8 |
| 141 | [phenyl]—$CH_2SCH_2SNa$ | 196,000 | 86 | 1.619 | 28.6 |
| 142 | [dithiolane ring]—$CH_2SNa$ | 189,000 | 90 | 1.654 | 30.2 |
| 143 | $H_3CSC_2H_4$—SNa | 187,000 | 92 | 1.602 | 30.5 |
| 144 | [adamantyl]—$SCH_2SNa$ | 195,000 | 88 | 1.612 | 34.3 |
| 145 | [trithiane ring]—$CH_2SNa$ | 189,000 | 89 | 1.652 | 30.0 |

TABLE 22-continued

| Example | Sulfur-containing agent | Polymer product MW (PS converted) | P rate (%) | Refractive index ($n_d$) | Abbe's number |
|---|---|---|---|---|---|
| 146 | 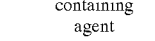 | 190,000 | 85 | 1.647 | 30.2 |

Example 147

In a glass vessel equipped with a nitrogen inlet tube, a thermometer, a reflux condenser and an agitator were placed 399 g of bisphenol-A-diglycidyl ether (epoxy equivalent: 190 g/eq), 186 g of 4,4'-dihydroxybiphenyl and 1.5 kg of N,N'-dimethylacetamide. The mixture was heated to 100° C. in an atmosphere of nitrogen and 6.0 g of triphenylphosphine was added. The mixture was gradually heated to 160° C. and stirred for 5 hours to complete the reaction. Then the mixture was cooled to room temperature, and 158 g of pyridine was added. To the solution at room temperature was added 114 g of tosyl chloride (0.6 mol) over 1 hour, and the mixture was stirred at room temperature for additional 10 hours to complete the tosylation reaction. The reaction mixture was added dropwise to a vigorously stirred mixture of water-methanol (4:1) (30 L) over 3 hours, to precipitate a polymer. The polymer was filtered, washed with 10 L of water and dried, to provide a tosylated bisphenol-A-biphenyl-polyhydroxy ether.

The tosylated bisphenol-A-biphenyl-polyhydroxy ether was dissolved in 1.5 kg of N,N-dimethyl-2-imidazolidinone (DMi). To the mixture at room temperature was added 86 g of ethylthioethyl mercaptan sodium salt (0.6 mol), and the mixture was stirred at room temperature for 15 hours, to complete the reaction.

The reaction mixture was added to 10 L of vigorously stirred methanol over 3 hours, to precipitate a polymer. The polymer was filtered and washed with 2 L of methanol and then 4 L of distilled water. The resulting wet cake was stirred and dispersed in 2 L of distilled water, and the suspension was heated to 90 to 100° C. It was filtered, washed with 4 L of distilled water and dried, to provide 574 g of polymer, whose ethylthioethylthio-substitution rate (pendant-forming rate) for hydroxy groups was 20%.

The sulfur-containing (thio)ether (co)polymer was clear and had a weight-average molecular weight of 152,000, a refractive index of 1.618 and an Abbe's number of 30.5. This polymer had an adequately high heat-distortion temperature of 120° C. or higher.

Examples 148 to 152

The tosylated bisphenol-A-biphenyl-polyhydroxy ether in Example 147 was subject to pendant-forming reaction with one of the sulfur-containing agents shown in Table 23, as described in Example 147, to provide a sulfur-containing (thio)ether (co)polymer. All of the polymers had excellent optical properties and heat resistance as was for the polymer in Example 147. The results are also summarized in Table 23.

TABLE 23

| Example | Sulfur-containing agent | Polymer product MW (PS converted) | P rate (%) | Refractive index ($n_d$) | Abbe's number |
|---|---|---|---|---|---|
| 148 | $H_3CSC_2H_4SC_2H_4$—SNa | 155,000 | 12 | 1.617 | 30.4 |
| 149 | cyclohexyl—SNa | 154,500 | 24 | 1.610 | 31.2 |
| 150 | 1,3-dithiolane-2-COSNa | 152,200 | 21 | 1.622 | 30.2 |
| 151 | 1,2,4-tris(methylthio/SNa)benzene ($H_3CS$—, $SCH_3$, —SNa) | 153,400 | 27 | 1.634 | 29.4 |
| 152 | thiophene-2-SNa | 151,800 | 22 | 1.631 | 29.3 |

Example 153

A tosylated bisphenol-A-biphenyl-polyhydroxy ether was prepared as described in Example 148, except that 305 g of tosyl chloride (1.6 mol) was used. The tosylated bisphenol-A-biphenyl-polyhydroxy ether was dissolved in 1.5 kg of N,N-dimethyl-2-imidazolidinone (DMi). To the mixture at room temperature was added 208 g of methylthioethyl mercaptan sodium salt (1.6 mol), and the mixture was stirred at room temperature for 15 hours, to complete the reaction.

The reaction mixture was added to 10 L of vigorously stirred methanol over 3 hours, to precipitate a polymer. The polymer was filtered and washed with 2 L of methanol and then 4 L of distilled water. The resulting wet cake was stirred and dispersed in 2 L of distilled water, and the suspension was heated to 90 to 100° C. It was filtered, washed with 4 L of distilled water and dried, to provide 667 g of polymer, whose methylthioethylthio-substitution rate (pendant-forming rate) for hydroxy groups was 71%.

The sulfur-containing (thio)ether (co)polymer was clear and had a weight-average molecular weight of 175,000, a refractive index of 1.631 and an Abbe's number of 30.4. This polymer had an adequately high heat-distortion temperature of 120° C. or higher.

Examples 154 to 158

The tosylated bisphenol-A-biphenyl-polyhydroxy ether in Example 153 was subject to pendant-forming reaction with one of the sulfur-containing agents shown in Table 24, as described in Example 153, to provide a sulfur-containing (thio)ether (co)polymer. All of the polymers had excellent optical properties and heat resistance as was for the polymer in Example 153. The results are also summarized in Table 24.

Example 159

In a glass vessel equipped with a nitrogen inlet tube, a thermometer, a reflux condenser and an agitator were placed 372 g of 4,4'-diglycidyloxy-3,5,3',5'-tetramethylbiphenyl (epoxy equivalent: 177.2 g/eq), 228 g of bisphenol A and 2.0 kg of N,N'-dimethylacetamide. The mixture was heated to 100° C. in an atmosphere of nitrogen and 6.0 g of triphenylphosphine was added. The mixture was gradually heated to 160° C. and stirred for 5 hours to complete the reaction. Then the mixture was cooled to room temperature, and 202 g of triethylamine was added. To the solution at room temperature was added 281 g of tosyl chloride (2.0 mol) over 1 hour, and the mixture was stirred at room temperature for additional 10 hours to complete the tosylation reaction. The reaction mixture was added dropwise to a vigorously stirred mixture of water-methanol (4:1) (30 L) over 3 hours, to precipitate a polymer. The polymer was filtered, washed with 5 L of water and dried, to provide a tosylated bisphenol-A-biphenyl-polyhydroxy ether.

The tosylated bisphenol-A-biphenyl-polyhydroxy ether was dissolved in 2.0 kg of N,N-dimethyl-2-imidazolidinone (DMi). To the mixture at room temperature was added 282 g of 2-mercaptothiazoline sodium salt (2.0 mol), and the mixture was stirred at room temperature for 25 hours, to complete the reaction.

The reaction mixture was added to 15 L of vigorously stirred methanol over 3 hours, to precipitate a polymer. The polymer was filtered and washed with 2 L of methanol and then 4 L of distilled water. The resulting wet cake was stirred and dispersed in 2 L of distilled water, and the suspension was heated to 90 to 100° C. It was filtered, washed with 4 L of distilled water and dried, to provide 754 g of polymer, whose thiazoline-2-thio-substitution rate (pendant-forming rate) for hydroxy groups was 81%.

TABLE 24

| Example | Sulfur-containing agent | Polymer product MW (PS converted) | P rate (%) | Optical properties Refractive index ($n_d$) | Abbe's number |
|---|---|---|---|---|---|
| 154 | $(C_2H_5S)_2HCH_2C$—SNa | 177,500 | 65 | 1.621 | 31.0 |
| 155 | [tetrahydrothiopyranyl-SNa] | 169,800 | 73 | 1.631 | 31.4 |
| 156 | [thiazolyl-COSNa] | 172,300 | 70 | 1.655 | 27.4 |
| 157 | $H_3C$—[phenyl]—SNa | 174,600 | 74 | 1.632 | 28.4 |
| 158 | [camphor-SCH$_2$SNa] | 171,900 | 63 | 1.601 | 32.9 |

The sulfur-containing (thio)ether (co)polymer was clear and had a weight-average molecular weight of 209,500, a refractive index of 1.630 and an Abbe's number of 29.2. This polymer had an adequately high heat-distortion temperature of 120° C. or higher.

Examples 160 to 164

The tosylated bisphenol-A-biphenyl-polyhydroxy ether in Example 159 was subject to pendant-forming reaction with one of the sulfur-containing agents shown in Table 25, as described in Example 159, to provide a sulfur-containing (thio)ether (co)polymer. All of the polymers had excellent optical properties and heat resistance as was for the polymer in Example 159. The results are also summarized in Table 25.

to 50° C. and then cooled to room temperature. The unreacted thionyl bromide in the reaction solution was evaporated at a reduced pressure and the mixture was added dropwise to 40 L of methanol over 3 hours, to precipitate a polymer. The polymer was filtered, washed with 3 L of methanol and then 2 L of distilled water, and then dried, to give bisphenol-A-3,5,3',5'-tetrabromobiphenyl-polybromo ether. The polybromo ether polymer was dissolved in 2.5 kg of N,N-dimethyl-2-imidazolidinone (DMi). To the mixture at 60 to 70° C. was added 260 g of methylthioethyl mercaptan sodium salt (2.0 mol). The mixture was stirred at the temperature for 8 hours, to complete the reaction.

The reaction mixture was added to 30 L of vigorously stirred methanol over 3 hours, to precipitate a polymer. The polymer was filtered and washed with 3 L of methanol and then 2 L of distilled water, and then dried, to give 991 g of

TABLE 25

| Example | Sulfur-containing agent | Polymer product | | Optical properties | |
|---|---|---|---|---|---|
| | | MW (PS converted) | P rate (%) | Refractive index ($n_d$) | Abbe's number |
| 160 | $H_3CSH_2C-SNa$ | 205,300 | 80 | 1.603 | 31.0 |
| 161 | (1,3-dithiane-2-yl)-$CH_2SNa$ | 206,000 | 78 | 1.623 | 30.7 |
| 162 | phenyl-$CH_2SCH_2SNa$ | 210,700 | 84 | 1.624 | 29.4 |
| 163 | cyclohexyl-SNa | 205,100 | 80 | 1.580 | 33.5 |
| 164 | (dimethylnorbornyl)-$SCH_2SNa$ | 206,900 | 76 | 1.581 | 34.8 |

Example 165

In a glass vessel equipped with a nitrogen inlet tube, a thermometer, a reflux condenser and an agitator were placed 387 g of bisphenol-A-2-methylglycidyl ether (epoxy equivalent: 184.3 g/eq), 501 g of 4,4'-dihydroxy-3,5,3',5'-tetrabromobiphenyl and 2.5 kg of N,N'-dimethylacetamide. The mixture was heated to 100° C. in an atmosphere of nitrogen, and 9.3 g of triphenylphosphine was added. The mixture was gradually heated to 160° C., stirred for 8 hours and then cooled to room temperature. The reaction mixture was added dropwise to vigorously stirred methanol (35 L) over 3 hours, to precipitate a polymer. The polymer was filtered, washed with 2 L of methanol and then 2 L of distilled water, and then dried.

The resulting polymer was added to a vigorously stirred solution of thionyl bromide (430 g, 2.1 mol) and pyridine (2.0 g) in chlorobenzene (4 kg) over 3 hours, and the mixture was stirred for 5 hours, stirred for additional 5 hours at 40 polymer, whose methylthioethylthio-substitution rate (pendant-forming rate) for bromines was 88%.

The sulfur-containing (thio)ether (co)polymer was clear and had a weight-average molecular weight of 121,000, a refractive index of 1.614 and an Abbe's number of 30.9. This polymer had an adequately high heat-distortion temperature of 120° C. or higher.

Examples 166 to 170

The bisphenol-A-3,5,3',5'-tetrabromobiphenyl-polybromo ether in Example 165 was subject to pendant-forming reaction with one of the sulfur-containing agents shown in Table 26, as described in Example 165, to provide a sulfur-containing (thio)ether (co)polymer. All of the polymers had excellent optical properties and heat resistance as was for the polymer in Example 165. The results are also summarized in Table 26.

TABLE 26

| Example | Sulfur-containing agent | Polymer product MW (PS converted) | P rate (%) | Optical properties Refractive index ($n_d$) | Abbe's number |
|---|---|---|---|---|---|
| 166 | $H_3CSC_2H_4$—SNa | 118,000 | 85 | 1.627 | 31.5 |
| 167 | $(C_2H_5S)_2HC$—COSNa | 121,900 | 90 | 1.618 | 31.5 |
| 168 | ![1,3-dithiane-2-yl with SNa] | 123,000 | 84 | 1.648 | 30.8 |
| 169 | ![phenyl-CH2SC2H4SNa] | 119,800 | 81 | 1.644 | 29.6 |
| 170 | ![1,3-dithiolan-2-yl-CH2SNa] | 120,500 | 91 | 1.648 | 30.7 |

Example 171

In a glass vessel equipped with a nitrogen inlet tube, a thermometer, a reflux condenser and an agitator were placed 347 g of 4,4'-diglycidylthiobiphenyl (epoxy equivalent: 165.2 g/eq), 260 g of 2,2-bis(4-mercaptophenyl)propane (1 mol), 1.5 kg of N,N'-dimethylacetamide and 1.2 g of triphenylphosphine. The mixture was stirred at 100° C. for 5 hours in an atmosphere of nitrogen. The mixture was cooled to an internal temperature of 80 to 90° C. and 404 g of triethylamine was added, and then 421 g of 1,3,5-trithiane-2-carboxyl chloride (2.1 mol) was added dropwise over 3 hours. The reaction mixture was stirred at the temperature for additional 3 hours, and then cooled to room temperature. The reaction mixture was added dropwise over 3 hours into vigorously stirred methanol (3 L), to precipitate a polymer. The polymer was filtered, washed with 1 L of methanol and then 2 L of distilled water, and then dried. The resulting polymer was dissolved in 500 g of tetrahydrofuran, and was added dropwise over 3 hours into vigorously stirred methanol (3 L), to precipitate a polymer. The polymer was filtered, washed with 1 L of methanol and then 2 L of distilled water, and then dried, to provide 891 g of the polymer, whose pendant-forming rate for hydroxy groups was 95%. The sulfur-containing (thio)ether polymer was clear and had a weight-average molecular weight of 187,000, a refractive index of 1.670 and an Abbe's number of 29.0. This polymer had an adequately high heat-distortion temperature of 120° C. or higher.

Examples 172 to 177

As described in Example 171, the diglycidyl thioether was reacted with one of the dithiols shown in Table 27, to give a polyhydroxy thioether. The thioether was subject to a pendant-forming reaction with a sulfur-containing agent, to provide a sulfur-containing thioether polymer. When the polyhydroxy thioether was inadequately reactive, its hydroxy group was converted into sodium salt, and then it was reacted with a sulfur-containing agent. All of the polymers had excellent optical properties and heat resistance as was for the polymer in Example 171. The results are summarized in Table 28.

TABLE 27

| Example | Starting materials | | |
|---|---|---|---|
| | Dithiol | Diglycidyl thioether | Sulfur-containing agent |
| 172 | | | |
| 173 | | | |
| 174 | | | |
| 175 | | | |
| 176 | | | |
| 177 | | | |

TABLE 28

| Example | Polymer product | | Optical properties | |
| --- | --- | --- | --- | --- |
| | MW (PS converted) | P rate (%) | Refractive index ($n_d$) | Abbe's number |
| 172 | 178,000 | 65 | 1.662 | 28.0 |
| 173 | 159,000 | 52 | 1.653 | 29.8 |
| 174 | 188,500 | 81 | 1.651 | 29.0 |
| 175 | 139,000 | 21 | 1.665 | 28.5 |
| 176 | 177,000 | 75 | 1.670 | 29.3 |
| 177 | 129,500 | 32 | 1.651 | 29.8 |

Example 178

The starting materials in Example 171 were reacted as described in the example, the reaction mixture was cooled to room temperature and 404 g of triethylamine was added. To the solution at room temperature was added 477 g of tosyl chloride (2.5 mol) over 1 hour, and the solution was stirred at room temperature for additional 10 hours to complete the tosylation reaction. The reaction mixture was added dropwise to a vigorously stirred mixture of water-methanol (4:1) (30 L) over 3 hours, to precipitate a polymer. The polymer was filtered, washed with 10 L of water and dried, to provide a tosylated bisphenol-A-biphenyl-polyhydroxy thioether.

The tosylated bisphenol-A-biphenyl-polyhydroxy thioether was dissolved in 1.5 kg of N,N-dimethyl-2-imidazolidinone (DMi). To the mixture at room temperature was added 330 g of thiophenol sodium salt (2.5 mol), and the mixture was stirred at room temperature for 12 hours, to complete the reaction. The reaction mixture was added to 15 L of vigorously stirred methanol over 3 hours, to precipitate a polymer. The polymer was filtered and washed with 2 L of methanol and then 3 L of distilled water. The resulting wet cake was stirred and dispersed in 2 L of distilled water, and the suspension was heated to 90 to 100° C. It was filtered, washed with 4 L of distilled water and dried, to provide 898 g of polymer, whose phenylthio-substitution rate (pendant-forming rate) for hydroxy groups was 92%.

The sulfur-containing thioether polymer was clear and had a weight-average molecular weight of 178,000, a refractive index of 1.669 and an Abbe's number of 28.5. This polymer had an adequately high heat-distortion temperature of 120° C. or higher.

Examples 179 to 184

As described in Example 178, one of the dithiols shown in Table 29 and the diglycidyl thioether were reacted to provide a tosylated polyhydroxy thioether, which was then reacted with the -SNa-containing pendant-forming agent shown in Table 29, to give a sulfur-containing thioether polymer. All of the polymers had excellent optical properties and heat resistance as was for the polymer in Example 178. The results are summarized in Table 30.

TABLE 29

| Example | Starting materials | | |
|---|---|---|---|
| | Dithiol | Diglycidyl thioether | Sulfur-containing agent |
| 179 | HS–C6H4–C6H4–SH | glycidyl-S-C6H4-C6H4-S-glycidyl | cyclohexyl-SNa |
| 180 | HS–C6H4–S–C6H4–SH | glycidyl-S-C6H4-S-C6H4-S-glycidyl | C2H5–SNa |
| 181 | HS–C6H4–S–C6H4–SH | glycidyl-S-C6H4-S-C6H4-S-glycidyl | camphor-SCH2SNa |
| 182 | HS–C6H4–C(CH3)2–C6H4–SH | glycidyl-S-C6H4-C(CH3)2-C6H4-S-glycidyl | thiazoline-SNa |
| 183 | HS–C6H4–C6H4–SH | glycidyl-S-C6H4-C6H4-S-glycidyl | C6H5CH2CH2SNa |
| 184 | HS–CH2CH2–SH | glycidyl-S-C6H4-C6H4-S-glycidyl | dithiane-CH2SNa |

TABLE 30

| Example | Polymer product | | Optical properties | |
| | MW (PS converted) | P rate (%) | Refractive index ($n_d$) | Abbe's number |
| --- | --- | --- | --- | --- |
| 179 | 188,000 | 80 | 1.659 | 29.5 |
| 180 | 155,000 | 91 | 1.666 | 26.5 |
| 181 | 185,000 | 75 | 1.650 | 30.8 |
| 182 | 145,000 | 21 | 1.657 | 28.7 |
| 183 | 181,000 | 53 | 1.663 | 27.0 |
| 184 | 132,500 | 76 | 1.658 | 30.5 |

Example 185

(Preparation and Evaluation for an Optical Disk)

To the sulfur-containing (thio)ether (co)polymer from Example 1 were added an antioxidant (phosphate type; JPP-613M, Johoku Kagaku Kogyo, 0.2%) and a mold release (phosphate type; Zelec UN, DuPont, 0.1%). The mixture was extruded with an extruder equipped with a pelletizer (cylinder temperature: 200° C.), to be pelletized. The pellet was dried at 110° C. for 4 hours, and was subject to injection molding at 210° C. Specifically, it was molded with a mold equipped with a stamper having a mirror surface to give a disk with an outer diameter of 120 mm and a thickness of 1.2 mm. The center part of the disk was punched with an inner diameter of 15 mm to give a doughnut type of disk. On one side of the disk was vacuum-deposited aluminum to form a reflective layer 600 nm of thickness. A bit error rate for the optical disk was determined using a laser beam with a wavelength of 780 nm, a linear velocity of 8 m/sec and a power of 0.8 mV. A significantly good value, $1\times10^{-6}$, was obtained.

Example 186

(Preparation and Evaluation of a Condenser Lens)

The pellet prepared in Example 185 was injected into a mold cavity in an injection molding machine having a small ball as an inlet-sealing mechanism in its resin inlet under the conditions of resin temperature: 220° C., mold temperature: 150° C., resin pressure: 1100 kg/cm², and then the resin inlet was sealed. The mold was cooled at a rate of 0.5° C./min. After the internal pressure of the mold reached an ambient pressure, the molding was removed from the mold to provide a condenser lens with dimensions of 80 mm×60 mm×15 mm. The condenser lens was found to be clear and excellent lens, exhibiting good surface-profile precision (significantly small curvature difference: 0.1% from the designed curvature) and no optical distortions.

As described above, this invention allows us to provide a thermoplastic optical resin exhibiting good optical, mechanical and thermal properties and a higher refractive index in an improved productivity. A sulfur-containing (thio)ether (co)polymer of this invention is useful for optical elements such as an optical disk substrate; a liquid-crystal plastic substrate; various optical lenses including an eyeglass; and an LED sealing coat. In particular, it exhibits good refractivity.

What is claimed is:

1. A sulfur-containing (thio)ether (co)polymer comprising repetitive structural units represented by general formulas 1 and 2:

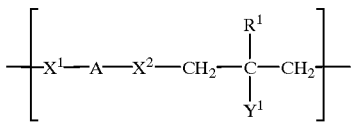

(1)

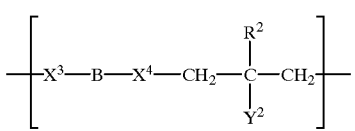

(2)

where A and B, which may be the same or different, are bivalent organic group; $R^1$ and $R^2$ are independently hydrogen or alkyl; $X^1$ to $X^4$, which may be the same or different, are independently oxygen or sulfur; $Y^1$ and $Y^2$, which may be the same or different, are independently halogen, hydroxy, —$OR^3$ or —$SR^4$, in which $R^3$ is sulfur-containing alkyl, aryl, heterocycle or acyl optionally having a substituent other than SH and $R^4$ is non-substituted or substituted alkyl, aryl, heterocycle or acyl although when at least one of $X^1$ to $X^4$ is sulfur, $R^3$ may not contain a sulfur atom; provided that —$OR^3$ and/or —$SR^4$ constitute 10 to 100% of the total of $Y^1+Y^2$.

2. A sulfur-containing (thio)ether (co)polymer as claimed in claim 1 wherein A and/or B is non-substituted or substituted bivalent aromatic group.

3. A sulfur-containing (thio)ether (co)polymer as claimed in claim 2 wherein A and B are bivalent aromatic groups represented by formulas 3 and 4, respectively:

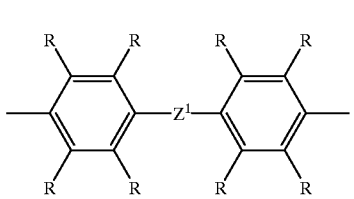

(3)

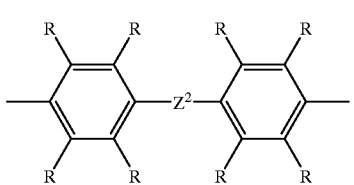

(4)

where R, which may be the same or different, is hydrogen, halogen or alkyl; and $Z^1$ and $Z^2$, which may be the same or different, are a single bond, —$C(CH_3)_2$—, —S— or —$SO_2$— linking the two aromatic groups together.

4. A sulfur-containing (thio)ether (co)polymer as claimed in claim 3 wherein $R^3$ is sulfur-containing alkyl, aryl, heterocycle or acyl containing at least two sulfur atoms or one sulfur atom when at least one of $X^1$ to $X^4$ is a sulfur atom; and $R^4$ is alkyl, aryl, heterocycle or acyl containing at least one sulfur atom.

5. A sulfur-containing (thio)ether (co)polymer as claimed in claim 4 wherein $Z^1$ is —$C(CH_3)_2$—.

6. A sulfur-containing (thio)ether (co)polymer as claimed in claim 5 wherein $X^1$ and $X^2$ are oxygen.

7. A sulfur-containing (thio)ether (co)polymer as claimed in claim 5 wherein $Z^1$ is —C(CH$_3$)$_2$— and $Z^2$ is a single bond or —C(CH$_3$)$_2$—.

8. A sulfur-containing (thio)ether (co)polymer as claimed in claim 7 wherein all of $X^1$ to $X^4$ are oxygen.

9. A sulfur-containing (thio)ether (co)polymer as claimed in claim 4 wherein $Z^1$ is —S—.

10. A sulfur-containing (thio)ether (co)polymer as claimed in claim 9 wherein $X^1$ and $X^2$ are sulfur.

11. An optical element manufactured using a sulfur-containing (thio)ether (co)polymer as claimed in claim 3.

12. A plastic lens manufactured using a sulfur-containing (thio)ether (co)polymer as claimed in claim 3.

13. A sulfur-containing (thio)ether (co)polymer as claimed in claim 3 wherein $Z^1$ is —C(CH$_3$)$_2$—.

14. A sulfur-containing (thio)ether (co)polymer as claimed in claim 13 wherein $X^1$ and $X^2$ are oxygen.

15. A sulfur-containing (thio)ether (co)polymer as claimed in claim 13 wherein $Z^1$ is —C(CH$_3$)$_2$— and $Z^2$ is a single bond or —C(CH$_3$)$_2$—.

16. A sulfur-containing (thio)ether (co)polymer as claimed in claim 15 wherein all of $X^1$ to $X^4$ are oxygen.

17. A sulfur-containing (thio)ether (co)polymer as claimed in claim 3 wherein $Z^1$ is —S—.

18. A sulfur-containing (thio)ether (co)polymer as claimed in claim 17 wherein $X^1$ and $X^2$ are sulfur.

19. An optical element manufactured using a sulfur-containing (thio)ether (co)polymer as claimed in claim 2.

20. An optical element manufactured using a sulfur-containing (thio)ether (co)polymer as claimed in claim 1.

21. A plastic lens manufactured using a sulfur-containing (thio)ether (co)polymer as claimed in claim 2.

22. A plastic lens manufactured using a sulfur-containing (thio)ether (co)polymer as claimed in claim 1.

* * * * *